(12) United States Patent
Ito et al.

(10) Patent No.: US 11,551,087 B2
(45) Date of Patent: Jan. 10, 2023

(54) INFORMATION PROCESSOR, INFORMATION PROCESSING METHOD, AND STORAGE MEDIUM

(71) Applicant: FUJITSU LIMITED, Kawasaki (JP)

(72) Inventors: Makiko Ito, Kawasaki (JP); Katsuhiro Yoda, Kodaira (JP); Wataru Kanemori, Sawara (JP)

(73) Assignee: FUJITSU LIMITED, Kawasaki (JP)

( * ) Notice: Subject to any disclaimer, the term of this patent is extended or adjusted under 35 U.S.C. 154(b) by 433 days.

(21) Appl. No.: 16/816,522

(22) Filed: Mar. 12, 2020

(65) Prior Publication Data
US 2020/0311545 A1    Oct. 1, 2020

(30) Foreign Application Priority Data

Mar. 29, 2019  (JP) .............................. JP2019-067701

(51) Int. Cl.
*G06N 3/08* (2006.01)
*G06F 17/18* (2006.01)
*G06N 3/04* (2006.01)

(52) U.S. Cl.
CPC ............... *G06N 3/08* (2013.01); *G06F 17/18* (2013.01); *G06N 3/04* (2013.01)

(58) Field of Classification Search
None
See application file for complete search history.

(56) References Cited

U.S. PATENT DOCUMENTS

| 2008/0056616 A1 | 3/2008 | Hasegawa |
| 2018/0107451 A1* | 4/2018 | Harrer ................. G06N 3/0454 |

(Continued)

FOREIGN PATENT DOCUMENTS

| CN | 108364065 A | 8/2018 |
| JP | 4-190399 | 7/1992 |
| JP | 7-84975 | 3/1995 |

(Continued)

OTHER PUBLICATIONS

Carmichael et al. ("Deep Positron: A Deep Neural Network Using the Posit No. System" 2018, Neuromorpic AI Lab, Rochester Institute of Technology, NY, USA). (Year: 2018).*

(Continued)

*Primary Examiner* — Roy Y Yi
(74) *Attorney, Agent, or Firm* — Staas & Halsey LLP

(57) ABSTRACT

An information processor includes a memory; and a processor coupled to the memory and the processor configured to: acquire first statistical information about distribution of most significant bit position that is not a sign or least significant bit position that is not zero for each of a plurality of first fixed-point number data, the data being a computation result of the computation in the first layer; execute computation on a plurality of output data of the first layer according to a predetermined rule, in the computation in the second layer; and acquire second statistical information based on the predetermined rule and the first statistical information, and determine a bit range for limiting a bit width when a plurality of second fixed-point number data, the data being a computation result of the computation in the second layer, are stored in a register, based on the second statistical information.

7 Claims, 30 Drawing Sheets

(56) References Cited

U.S. PATENT DOCUMENTS

2019/0227769 A1    7/2019  Chen et al.
2019/0339939 A1    11/2019 Ito et al.

FOREIGN PATENT DOCUMENTS

| JP | 2008-59287    |         | 3/2008  |
|----|---------------|---------|---------|
| JP | 2009-271598   |         | 11/2009 |
| JP | 2012-203566   |         | 10/2012 |
| JP | 2018-124681   |         | 8/2018  |
| WO | 2018/139266   | A1      | 8/2018  |

OTHER PUBLICATIONS

Office Action dated Oct. 21, 2021, in European Patent Application No. 20163271.8.
Extended European Search Report dated May 29, 2020, in corresponding European Patent Application No. 20163271.8 (8 pages).

* cited by examiner

INPUT (INTERMEDIATE DATA: in (N bit = 40 bit))

in [N-1] SIGN BIT      in [0] BIT

OUTPUT (STATISTICAL INFORMATION (BIT PATTERN BP): out (N bit = 40 bit))

| input | | | | | | | output(BP) |
|---|---|---|---|---|---|---|---|
| in[39] | in[38] | in[37] | in[36] | ... | in[1] | in[0] | out |
| 0 | 0 | 0 | 0 | ... | 0 | 0 | 0x8000000000 |
| 1 | 1 | 1 | 1 | ... | 1 | 1 | 0x8000000000 |
| 0 | 1 | b | b | ... | b | b | 0x4000000000 |
| 1 | 0 | b | b | ... | b | b | 0x4000000000 |
| 0 | 0 | 1 | b | ... | b | b | 0x2000000000 |
| 1 | 1 | 0 | b | ... | b | b | 0x2000000000 |
| 0 | 0 | 0 | 1 | ... | b | b | 0x1000000000 |
| 1 | 1 | 1 | 0 | ... | b | b | 0x1000000000 |
| : | : | : | : | : | : | : | : |
| 0 | 0 | 0 | 0 | ... | 1 | b | 0x0000000002 |
| 1 | 1 | 1 | 1 | ... | 0 | b | 0x0000000002 |
| 0 | 0 | 0 | 0 | ... | 0 | 1 | 0x0000000001 |
| 1 | 1 | 1 | 1 | ... | 1 | 0 | 0x0000000001 |

FIG. 22
INPUT (BIT PATTERN BP): BP (40 bit) ×
NUMBER OF ELEMENTS OF VECTOR COMPUTATOR (ex. 8)
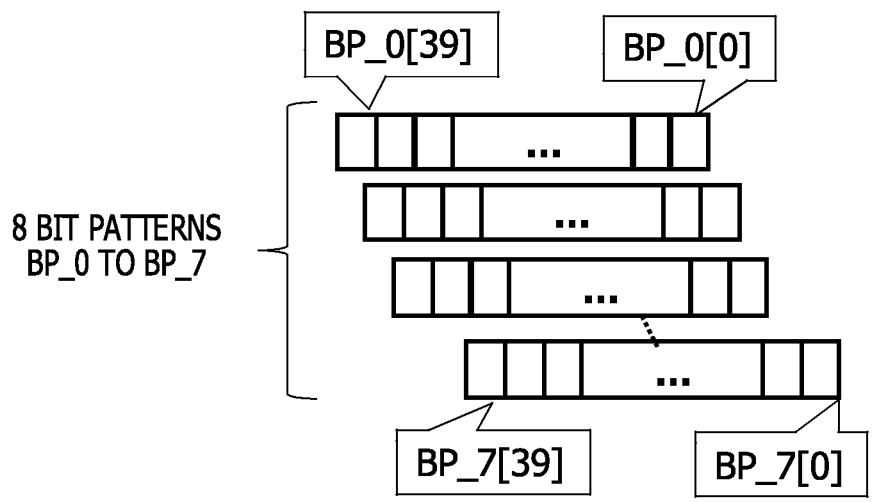
OUTPUT (AGGREGATED VALUE): out (log2) NUMBER OF ELEMENTS) + 1) bit) × 40
(ex. IN THE CASE OF 8 ELEMENTS, 4 bit × 40)
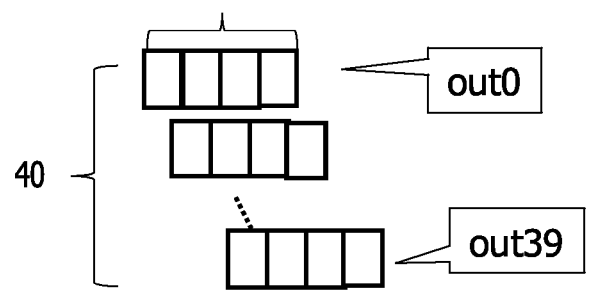

INFORMATION PROCESSOR, INFORMATION PROCESSING METHOD, AND STORAGE MEDIUM

CROSS-REFERENCE TO RELATED APPLICATION

This application is based upon and claims the benefit of priority of the prior Japanese Patent Application No. 2019-67701, filed on Mar. 29, 2019, the entire contents of which are incorporated herein by reference.

FIELD

The embodiments discussed herein are related to an information processor, an information processing method, and a storage medium.

BACKGROUND

Deep learning is machine learning using a multilayered neural network. A deep neural network (hereinafter referred to as DNN), which is an example of deep learning, is a network in which an input layer, a plurality of hidden layers, and an output layer are arranged in order. Each of the layers has one or more nodes, and each node has a value. The node of a certain layer is coupled to the node of a following layer via an edge, and each edge has a parameter such as weight or bias.

In the DNN, a value of the node in each layer is found by executing predetermined computation based on a value of the node in a preceding layer, the weight of the edge and so on. When input data is input to the node in the input layer, a value of the node in a following layer is found by executing the predetermined computation. Using the data found by the computation as an input, a value of the node in a following layer is found by executing the predetermined computation in the layer. A value of the node in the last output layer becomes output data with respect to the input data.

Since image data to be computed has a relatively small number of bits, a DNN processor that executes the computation of the DNN may execute computation using a fixed-point computator. In this case, a floating-point computator is not used and thus, power consumption for computation may be suppressed. The use of the fixed-point computator having more simple circuit configuration than the floating-point computator enables the DNN processor to be configured with small circuit dimension.

However, due to the fixed number of bits, the fixed-point number has a narrower dynamic range than the floating point number. For this reason, an overflow occurs as a result of computation such that a value of the computation result may be saturated. Conversely, low-order bits may be omitted due to underflow. This leads to a decrease in the accuracy of the computation result.

Thus, in the computation of the DNN, dynamic fixed-point that dynamically adjusts the decimal point position of the computation result data found by computation has been proposed. According to a known method of dynamically adjusting the decimal point position, statistical information about the distribution of the effective most significant bit position of intermediate data in the computation result in each layer is acquired, thereby adjusting the fixed-point position of the intermediate data to an optimum position, based on the acquired statistical information. Related techniques are disclosed in, for example, Japanese Laid-open Patent Publication Nos. 2018-124681, 2012-203566, 2009-271598, and 07-84975.

SUMMARY

According to an aspect of the embodiments, an information processor includes a memory; and a processor coupled to the memory and the processor configured to: in computation in a plurality of layers of a neural network for performing deep learning, acquire first statistical information about distribution of most significant bit position that is not a sign or least significant bit position that is not zero for each of a plurality of first fixed-point number data, the data being a computation result of the computation in the first layer; execute computation on a plurality of output data of the first layer according to a predetermined rule, in the computation in the second layer; acquire second statistical information based on the predetermined rule and the first statistical information; and determine a bit range for limiting a bit width when a plurality of second fixed-point number data, the data being a computation result of the computation in the second layer, are stored in a register, based on the second statistical information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is an explanatory diagram of operations of the statistical information aggregator;

DESCRIPTION OF EMBODIMENTS

In the method of acquiring the statistical information about the distribution of the effective number of digits in the computation result in each layer and adjusting the fixed-point position to the optimum decimal point position to keep the computation accuracy, the computation amount is increased by acquiring the statistical information in each layer of the DNN. In the processing of the DNN, since computation is repeated in the different layers to execute training process, an increase in the computation amount in the layers leads to an increase in time required to execute training process.

In consideration of such situations, it is desirable to provide an information processor, an information processing method, and an information processing program that reduce the computation amount while keeping the computation accuracy.

Figure 1:
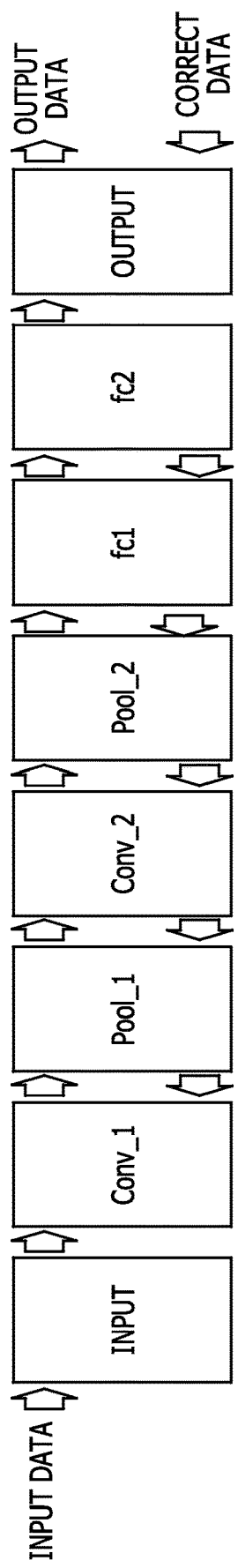
FIG. 1 is a diagram illustrating an example of a deep neural network (DNN)

FIG. 1 is a diagram illustrating an example of a deep neural network (DNN). The DNN in FIG. 1 is a model of image classification that inputs an image and classifies the image into a finite number of categories according to contents (for example, figures) of the input image. The DNN has an input Layer INPUT, a first convolution layer Conv_1, a first pooling layer Pool_1, a second convolution layer Conv_2, a second pooling layer Pool_2, a first fully coupled layer fc1, a second fully coupled layer fc2, and an output layer OUTPUT. Each layer has one or more nodes.

The convolution layer Conv_1 multiplies image pixel data input to plurality of nodes in the input Layer INPUT by a weight between the nodes, and outputs pixel data of an output image having features of the image to a plurality of nodes in the convolution layer Conv_1. This also applies to the convolution layer Conv_2.

The pooling layer Pool_1 is a layer having a node determined from a local node in the convolution layer Conv_1 that is a preceding layer, and accommodates a small change in the image by setting a maximum value of the local node to a value of its node.

The output layer OUTPUT finds the probability of belonging to each category from the value of the node, by using the SoftMax function or the like.

Figure 2:
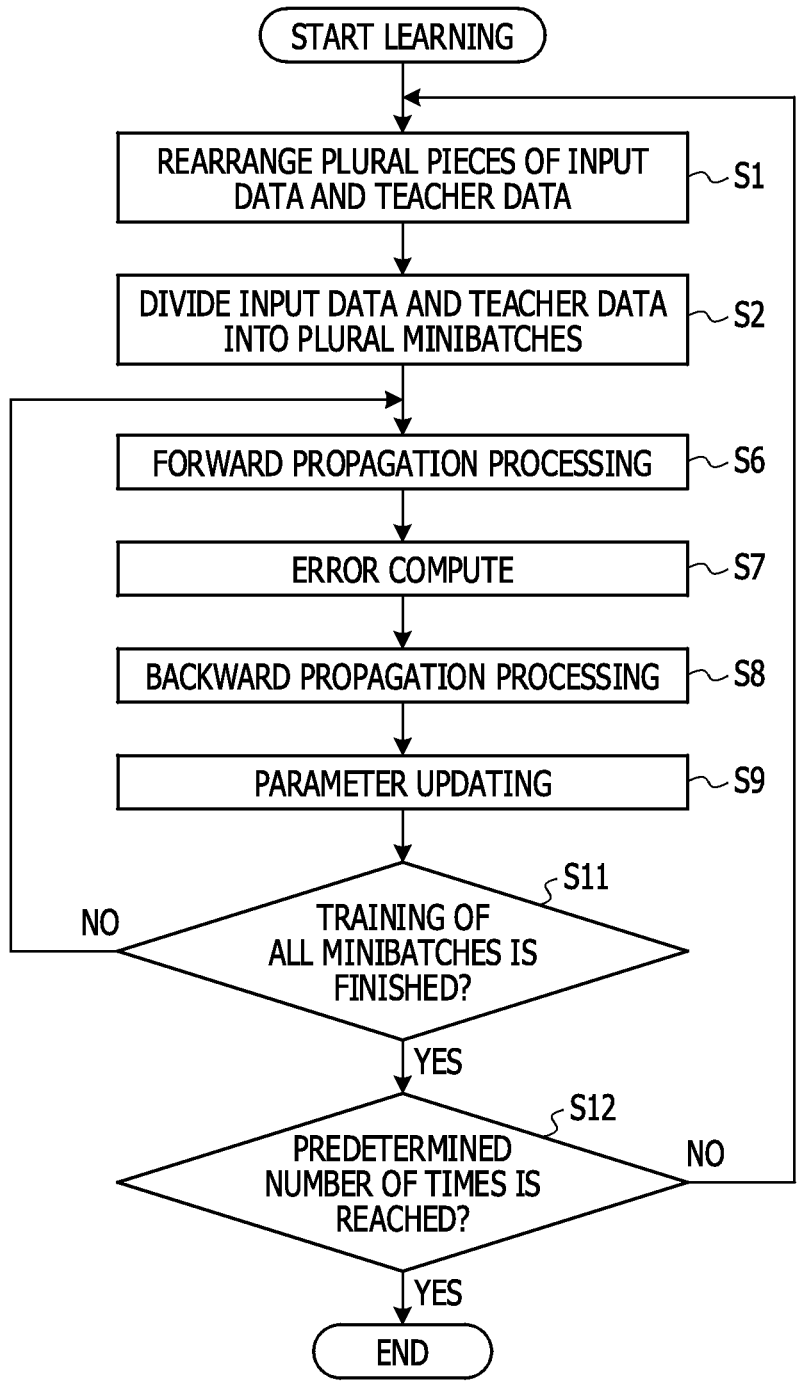
FIG. 2 is a flow chart of an example of training process of the DNN.

FIG. 2 is a flow chart illustrating an example of training process of the DNN. The training process uses, for example, a plurality of teacher data including input data and correct category label of outputs calculated from the input data by the DNN, to optimize a parameter such as weight in the DNN. In the example illustrated in FIG. 2, according to a minibatch method, a plurality of sets of the input data and the correct label, which correspond to each other one-to-one, are divided into a plurality of minibatches, and the plurality of input data divided into the minibatches and the teacher data corresponding to the input data are input. For each of the input data, the parameter such as weight is optimized so as to a difference (error) between the output data output from the DNN and the teacher data.

In the DNN, the plurality of layers may be configured of hardware circuits, and the hardware circuits may execute computation in the respective layers. Alternatively, the DNN may cause a processor to execute a program for executing computation in the layers of the DNN. The processing of the DNN as illustrated in FIG. 2 may be executed by a host machine and a DNN execution machine, which are described later.

As illustrated in FIG. 2, as advance preparations, the plurality of input data and the teacher data are randomly rearranged (S1), and the plurality of rearranged input data and teacher data are divided to plurality of minibatches (S2)

For each of the plurality of divided minibatches, forward propagation processing S6, error compute S7, backward propagation processing S8, and parameter updating S9 are repeated. When learning of all of the minibatches is finished (S11: YES), until a predetermined number of times is reached (S12: NO), the processing S1 to S2, S6 to S9, and S11 is repeated for the same input data.

In place of repeating the processing S1 to S2 and S6 to S9 for the same training data until the predetermined number of times is reached, processing may be finished when an estimation value of a learning result, for example, a difference (error) between the output data and the teacher data falls within a certain range.

In the forward propagation processing S6, computation in the layers is executed in a sequence from the input side to the output side of the DNN. Describing with reference to FIG. 1, the first convolution layer Conv_1 performs convolution of the plurality of input data of one minibatch input to the input Layer INPUT with the weight of the edge or the like, to generate a plurality of computation output data. The first pooling layer Pool_1 executes processing of decreasing the locality of the computation result of the convolution layer Conv_1. The second convolution layer Conv_2 and the second pooling layer Pool_2 execute the same processing as described above. Finally, the fully coupled layers fc1, fc2 performs convolution with the weight of all edges, and outputs output data to the output layer OUTPUT.

In the error estimation S7, a difference between the output data of the DNN and the teacher data is computed as an error. In the backward propagation processing S8, the error is propagated from the output side of the DNN to the input side. In the backward propagation processing S8, the error is propagated from the output side to the input side, and further, the propagated error in each layer is differentiated with respect to a parameter, and parameter change data is computed according to a gradient descent method. In the parameter updating S9, the current parameter is updated with the parameter change value found by the parameter gradient descent method to update the weight in each layer to an optimum value.

Figure 3:
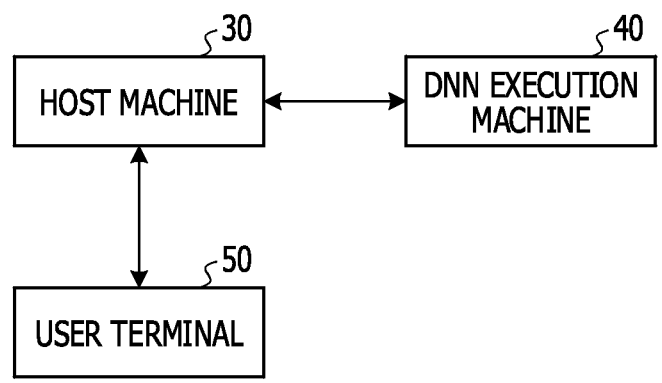
FIG. 3 is a diagram illustrating an example of a deep learning system.

FIG. 3 is a diagram illustrating an example of a deep learning system. The deep learning system has a host machine 30 and a DNN execution machine 40, and the host machine 30 is coupled to the DNN execution machine 40 for example, via a dedicated interface. The host machine 30 is also accessible from a user terminal 50. The user accesses the host machine 30 using the user terminal 50, and manipulates the DNN execution machine 40 to perform deep learning. According to an instruction from the user terminal 50, the host machine 30 creates a program to be executed by the DNN execution machine 40 to the DNN execution machine 40. The DNN execution machine 40 executes the transmitted program to perform deep learning.

Figure 4:
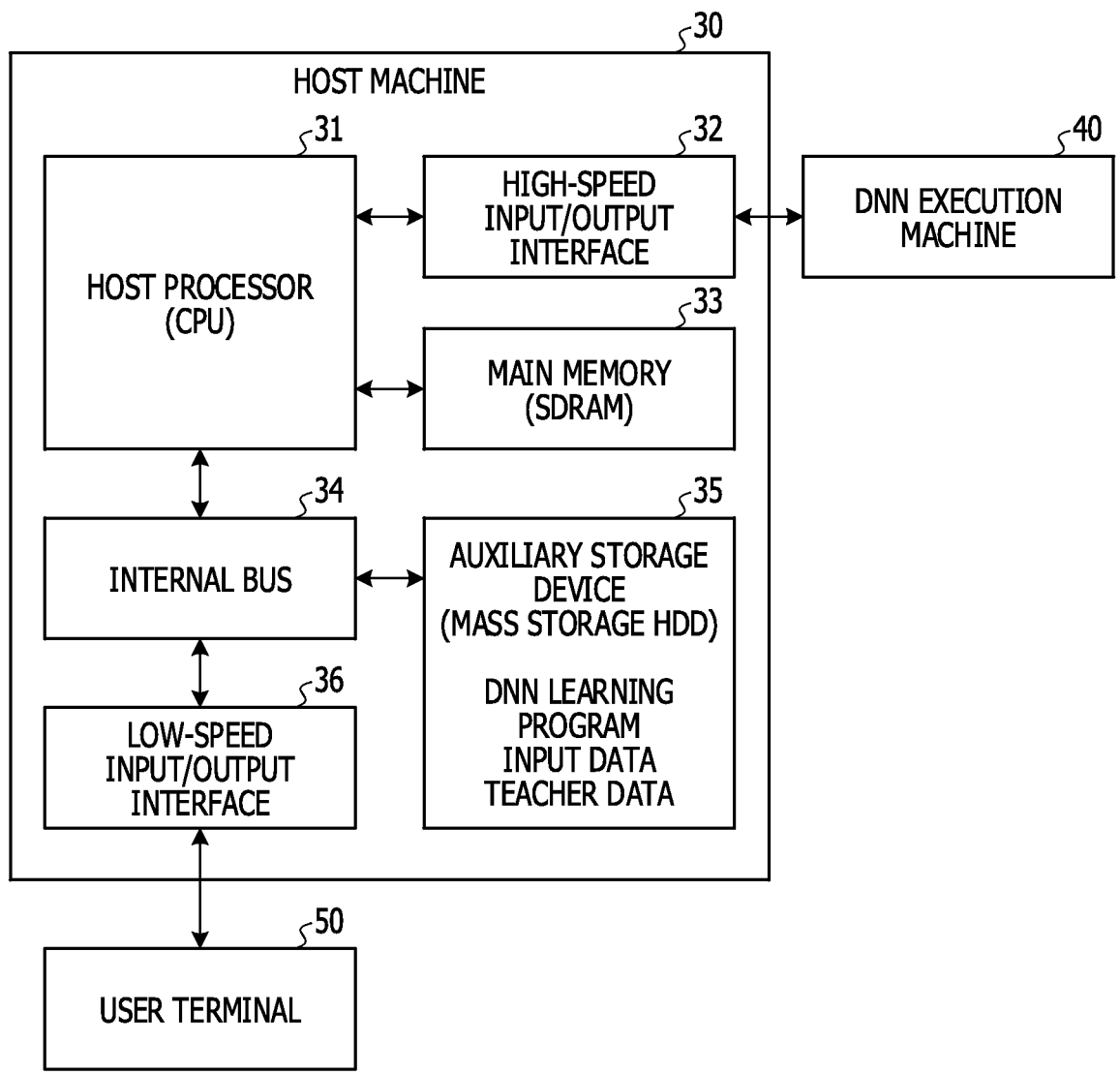
FIG. 4 is a diagram illustrating details of a host machine illustrated in FIG. 3.

FIG. 4 is a diagram illustrating details of the host machine 30 illustrated in FIG. 3. The host machine 30 includes a host processor 31 such as central processing unit (CPU), a high-speed input/output interface 32 for coupling to the DNN execution machine 40, a main memory 33 such as synchronous dynamic random-access memory (SDRAM), and an internal bus 34. The host machine 30 further includes an auxiliary storage device 35 such as a mass storage hard disk drive (HDD) coupled to the internal bus 34, and a low-speed input/output interface 36 for coupling to the user terminal 50.

The host processor 31 of the host machine 30 executes a program that is stored in the auxiliary storage device 35 and expanded in the main memory 33. The high-speed input/output interface 32 is an interface that couples the host processor 31 such as Peripheral Component Interconnect (PCI) Express to the DNN execution machine 40. The main memory 33 stores programs executed by the processor and data. The main memory 33 is, for example, SDRAM.

The internal bus 34 couples the processor to peripheral equipment having a lower speed than the processor, relaying communication therebetween. The low-speed input/output interface 36 makes coupling to a keyboard or mouse of the user terminal 50 such as Universal Serial Bus (USB), or to a network of the Ethernet.

As illustrated, the auxiliary storage device 35 stores a DNN training program, input data, and teacher data. The host processor 31 executes the DNN training program and transmits the training program, the input data, and teacher data to the DNN execution machine 40, thereby causing the DNN execution machine 40 to execute the training program.

Figure 5:
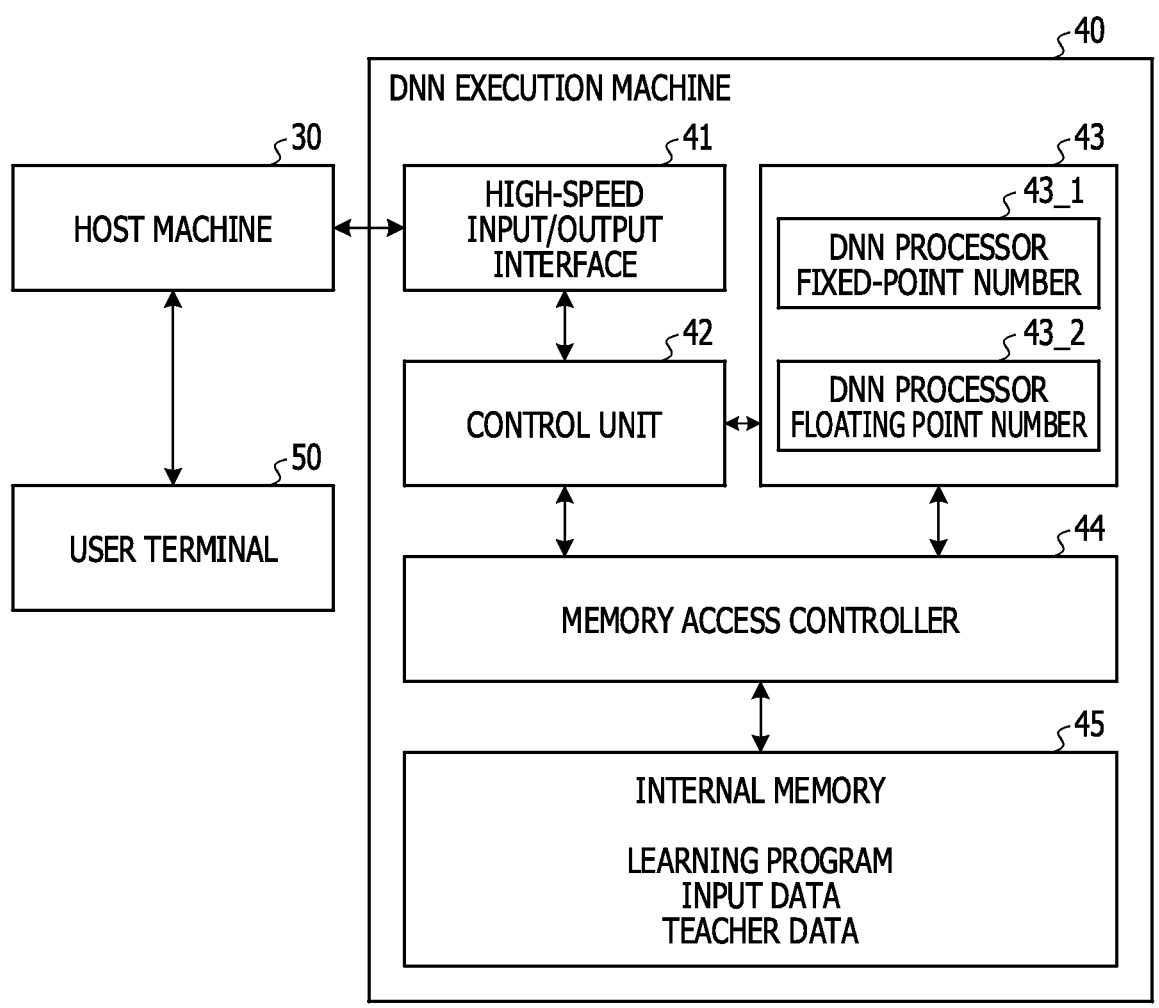
FIG. 5 is a diagram illustrating details of a DNN execution machine illustrated in FIG. 3.

FIG. 5 is a diagram illustrating details of the DNN execution machine 40 illustrated in FIG. 3. The DNN execution machine 40 includes a high-speed input/output interface 41 that relays communication with the host machine 30, and a control unit 42 that executes processing based on instructions and data from the host machine 30. The DNN execution machine 40 also includes a DNN processor 43, a memory access controller 44, and an internal memory 45.

Based on the program and data transmitted from the host machine 30, the DNN processor 43 executes the program to execute processing of deep learning. The DNN processor 43 has a DNN processor 43_1 that performs a fixed-point computation and a DNN processor 43_2 that performs a floating-point computation. However, the DNN processor 43_2 that performs the floating-point computation may be omitted.

The DNN processor 43_1 that executes fixed-point computation has a statistical information acquisition circuit that acquires intermediate data such as the parameter updated based on the computation result of the DNN and learning, and statistical information about the number of effective most significant bits and effective least significant bits of data in the memory. The DNN processor 43_1 that executes fixed-point computation acquires the statistical information about the intermediate data found by the computation while performing training, and adjusts the fixed-point position of intermediate data to an optimum position, based on the statistical information.

The high-speed input/output interface 41 is, for example, PCI Express, and relays communication with the host machine 30.

The control unit 42 stores programs and data from the host machine 30 in the internal memory 45, and in response to an instruction from the host machine 30, instructs the DNN processor 43 to execute the program. In response to an access request from the control unit 42 and an access request from the DNN processor 43, the memory access controller 44 controls access to the internal memory 45.

The internal memory 45 stores programs executed by the DNN processor 43, processed data, data on processing results, and so on. The internal memory 45 is, for example, SDRAM, higher-speed GDR5, or wide-area HBM2.

Figure 6:
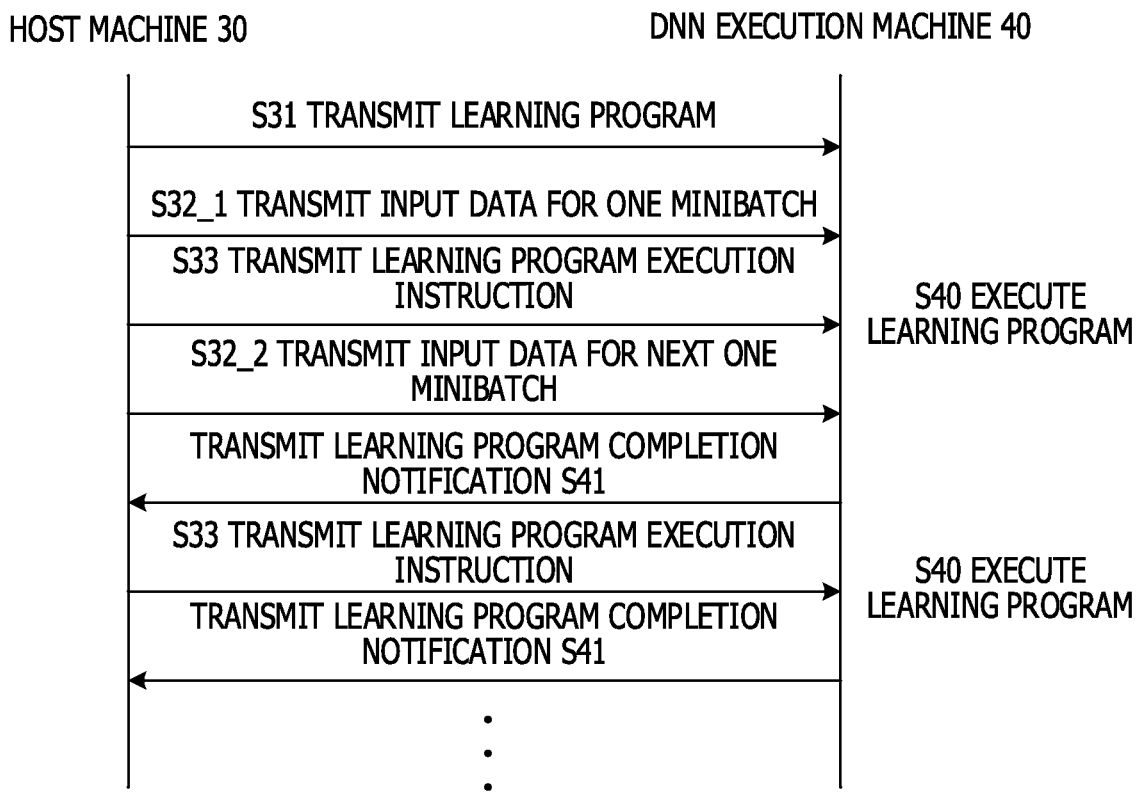
FIG. 6 is a sequence chart illustrating summary of deep training process of the host machine and the DNN execution machine.

FIG. 6 is a sequence chart illustrating details of summary of deep training process the host machine and the DNN execution machine 40. The host machine 30 transmits a training program of deep learning to the DNN execution machine 40 (S31), transmits input data for one minibatch (S32_1), and transmits a training program execution instruction (S33).

In response the transmission, the DNN execution machine 40 stores the input data and the training program in the internal memory 45, and in response to the training program execution instruction, executes the training program for the input data stored in the internal memory 45 (S40). The training program is executed by the DNN processor 43. The host machine 30 transmits input data for next one minibatch (S32_2), and waits until the DNN execution machine 40 completes the training program. In this case, the DNN execution machine 40 prepares two storage areas for input data.

When completing the training program, the DNN execution machine 40 transmits a training program completion notification to the host machine 30 (S41). The host machine 30 switches the input data area to be referred to by the training program, and transmits a training program execution instruction (S33). The DNN execution machine 40 executes the training program (S40), and transmits a training program completion notification (S41). This procedure is repeated to proceed training of the DNN.

The training of the DNN includes performing computation in each layer in the DNN forward direction (forward propagation processing), propagating an error between output data of the output layer and correct data in the DNN backward direction to compute an error in each layer, and calculating parameter change data to decrease the error (backward propagation processing), and updating a parameter based on the parameter change data (parameter updating). The whole of the training process of the DNN may be executed by the DNN execution machine 40, or a part of the leaning processing may be executed by the host machine 30.

Figure 7:
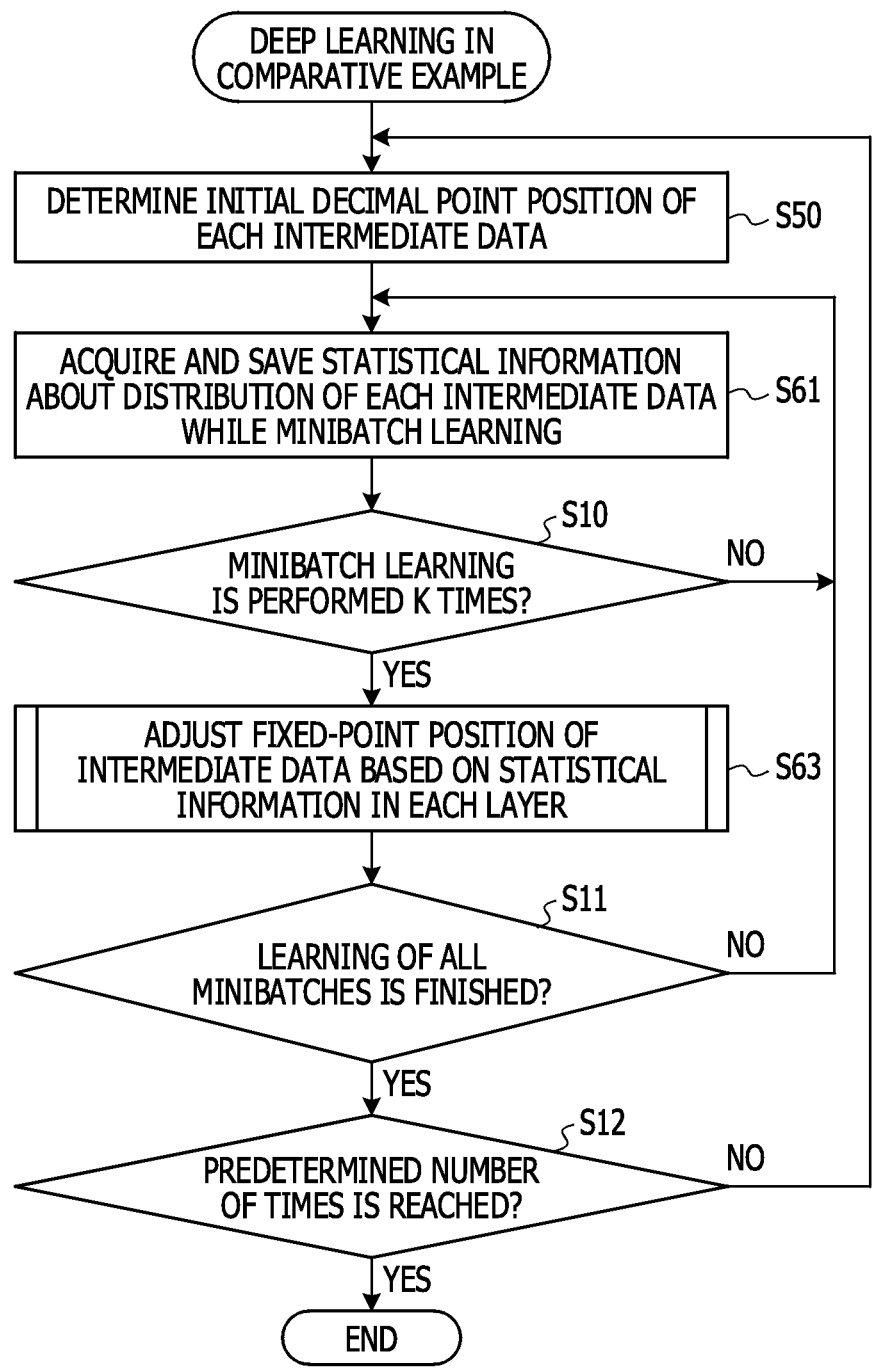
FIG. 7 is a flow chart of an example of deep learning.

FIG. 7 is a flow chart illustrating an example of deep learning. In an example of deep learning, statistical information about distribution of values of intermediate data in each layer is saved, and the fixed-point position of the intermediate data in each layer is adjusted based on the saved statistical information in each layer. The adjustment of the fixed-point position in FIG. 7 is performed in the processing S6 and S8 in FIG. 2.

First, the DNN processor 43 determines an initial decimal point position of each intermediate data (computation result in each layer, parameter, and so on) (S50). The initial decimal point position is determined by pre-training using the floating point number or user's designation. In the case of pre-training using the floating point number, since the intermediate data in the DNN is the floating point number, a characteristic corresponding to the magnitude of the intermediate data is generated. Thus, it is not required to adjust the decimal point position as in the case of the fixed-point number. The optimum decimal point position of the fixed-point number of each intermediate data is determined based on the intermediate data of the floating point number.

Next, the DNN processor 43 acquires and saves statistical information about the distribution of each intermediate data while performing training the minibatch (S61). The DNN processor 43_1 that operates the fixed-point computation included in the DNN processor 43 has the statistical information acquisition circuit that acquires statistical information about the distribution of effective bit such as the output of the fixed-point computator. The DNN processor 43 may perform the computation including the statistical information acquisition processing, thereby acquiring and saving the statistical information about the intermediate data during training of the minibatch. Each time the minibatch training is performed K times (S10: YES), the fixed-point position of each intermediate data in the DNN is adjusted based on the statistical information about the distribution of intermediate data in each layer (S63).

The statistical information acquisition circuit in the DNN processor 43 and a method for adjusting the fixed-point position based on the statistical information about the distribution in each layer will be described later in detail.

Until leaning of all minibatches is finished (S11: NO), the DNN processor 43 repeats the processing S61, S10, S63. When training of all minibatches is finished (S11: YES), until a predetermined number of times is reached (S12: NO), the DNN processor 43 returns to S50, and repeats training all minibatches. The processing S11, S12 in FIG. 7 is the same as the processing S11, S12 in FIG. 2.

Figure 8:
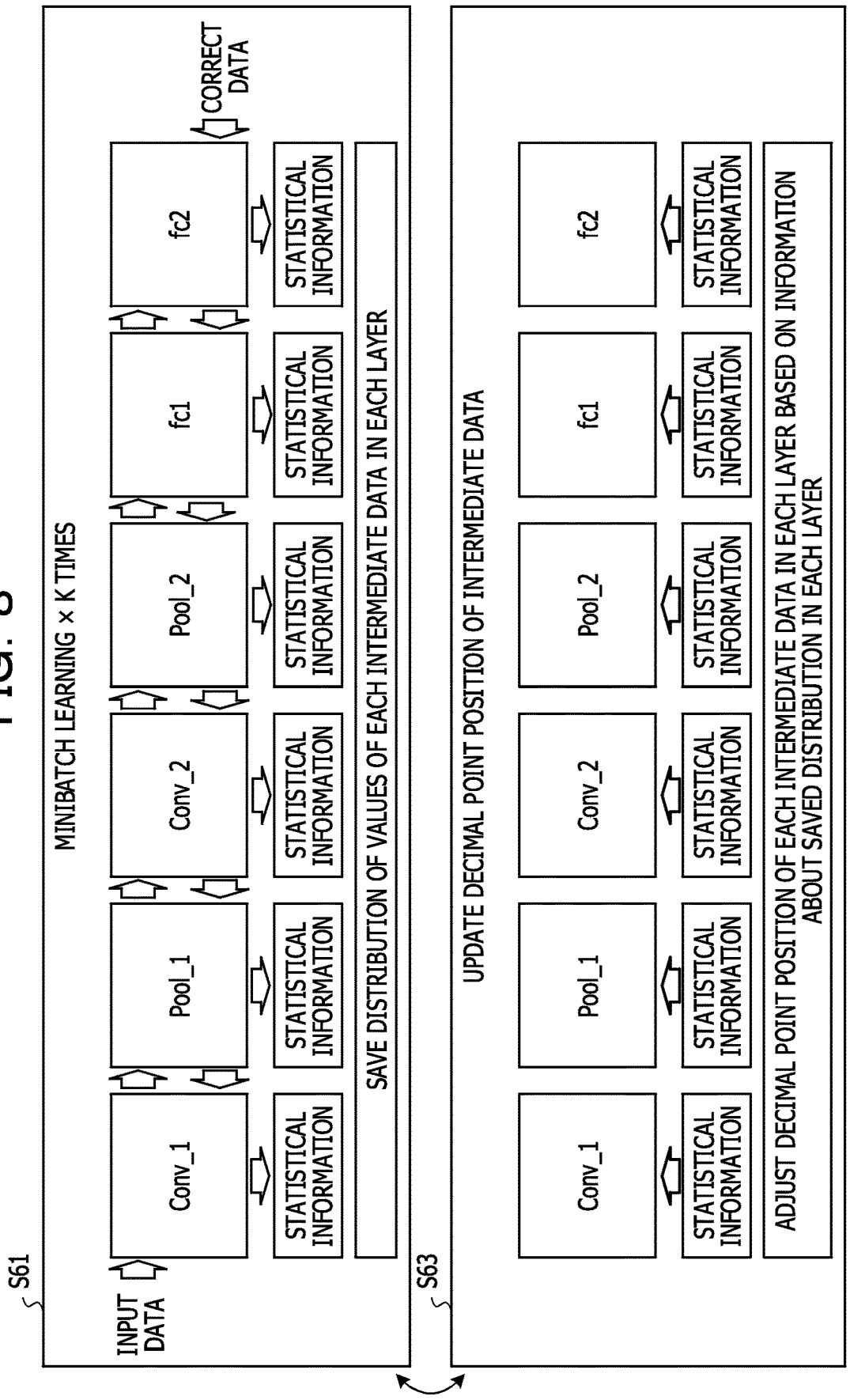
FIG. 8 is diagram illustrating details of S61 and S63 in the training process using dynamic fixed-point number illustrated in FIG. 7.

FIG. 8 is a diagram illustrating detailed processing in S61 and S63 among the processing of training using the dynamic fixed-point number in FIG. 7. In S61, the DNN processor 43 repeats minibatch training K times. In each minibatch training, for plurality of input data and teacher data of the minibatch, the DNN processor 43 acquires and saves the statistical information about the distribution of intermediate data in each layer in the processing while executing the forward propagation processing, the backward propagation processing, and the parameter updating processing in sequence.

In addition, in the processing S63 of leaning, the DNN processor 43 determines and updates the optimum decimal point position of each intermediate data, based on the distribution of effective bit of plurality of intermediate data in the saved statistical information.

Figure 9:
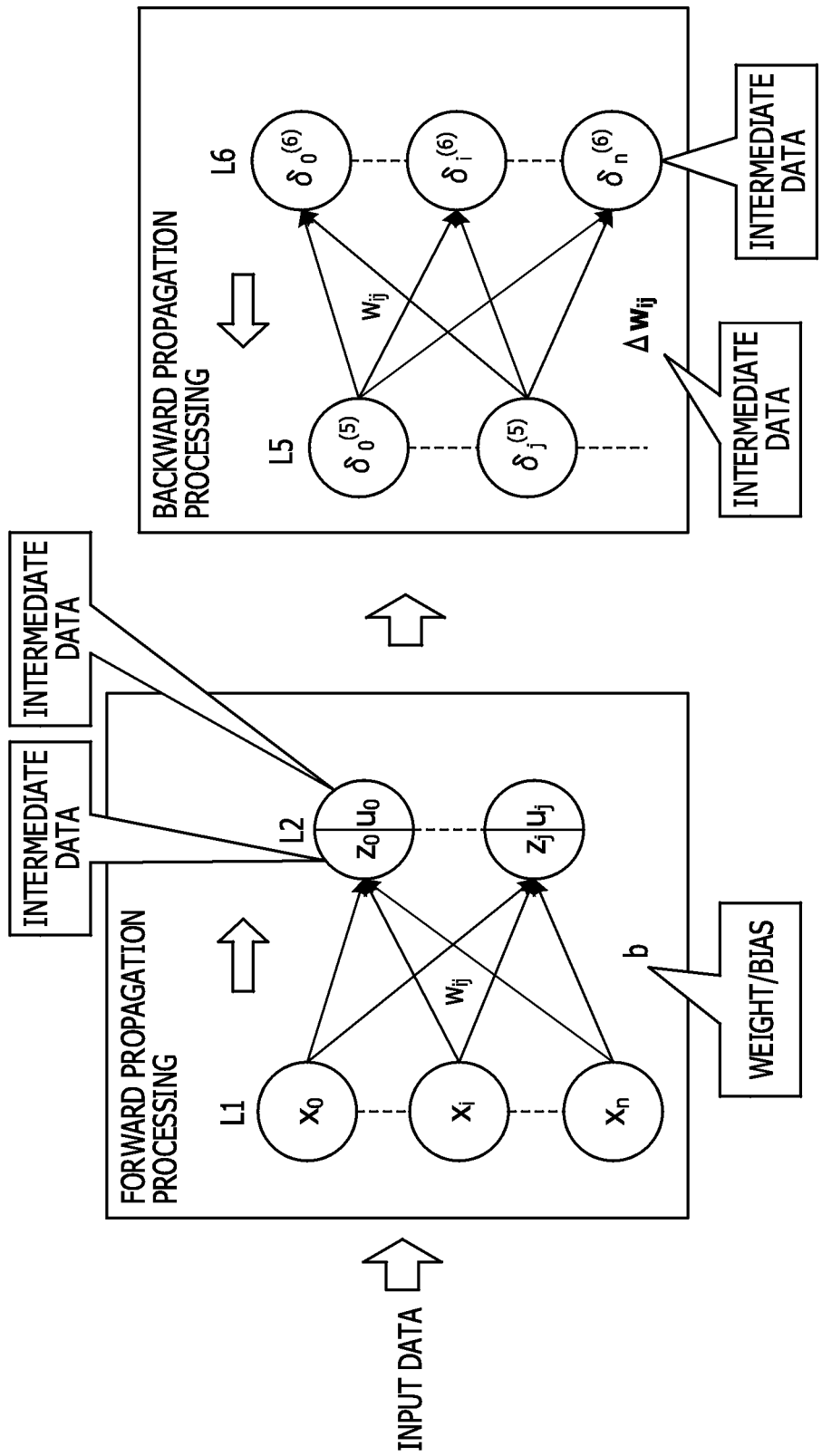
FIG. 9 is an explanatory diagram of forward propagation processing and backward propagation processing of the deep learning.

FIG. 9 is an explanatory diagram of the forward propagation processing and the backward propagation processing of deep learning. In the forward propagation processing, the fixed-point computator in the DNN processor 43 multiplies data $x_0$-$x_n$ at a node in a layer L1 near the input side by a link weight $w_{ij}$, and adds a bias b to it to operate output data $z_0$-$z_j$ . . . at a node in a layer L2 near the output side. Output data $u_0$-$u_j$ . . . of an activation function with respect to the output data $z_0$-$z_j$ . . . is computed by an activation function in the layer L2. The computation in the layers L1, L2 is repeated from the input side to the output side.

On the contrary, in the backward propagation processing, the fixed-point computator in the DNN processor 43 computes an error $\delta_0^{(5)}$-$\delta_j^{(5)}$ . . . in a layer L5 near the input side from an error (difference between output data and correct data, or propagated difference) $\delta_0^{(6)}$-$\delta_i^{(6)}$-$\delta_n^{(6)}$ in a layer L6 near the output side. Difference update data $\Delta w_{ij}$ is computed according to the direction of inclination of a value acquired by differentiating an error $r\delta_0^{(5)}$-$\delta_i^{(5)}$-$\delta_n^{(5)}$ in the layer L5 with respect to a parameter such as weight $W_{ij}$. The computation in the layers L6, L5 is repeated from the output side to the input side.

In the processing the parameter in each layer in sequence, the difference update data $\Delta w_{ij}$ is added to the existing weight $w_{ij}$ to compute updated weight $w_{ij}$.

In FIG. 9, the output data $z_0$-$z_j$ . . . and output data $u_0$-$u_j$ of the activation function . . . in the layer L2, the error $\delta_0^{(6)}$-$\delta_i^{(6)}$-$\delta_n^{(6)}$, the error $\delta_0^{(5)}$-$\delta_j^{(5)}$ . . . in the layers L6, L5, the difference update data $\Delta w_{ij}$ of the weight, and the updated weight $w_{ij}$ are intermediate data of the DNN. The decimal point position of the intermediate data may be adjusted to the optimum position, thereby increasing the computation accuracy of each intermediate data to enhance the training accuracy.

Figure 10:
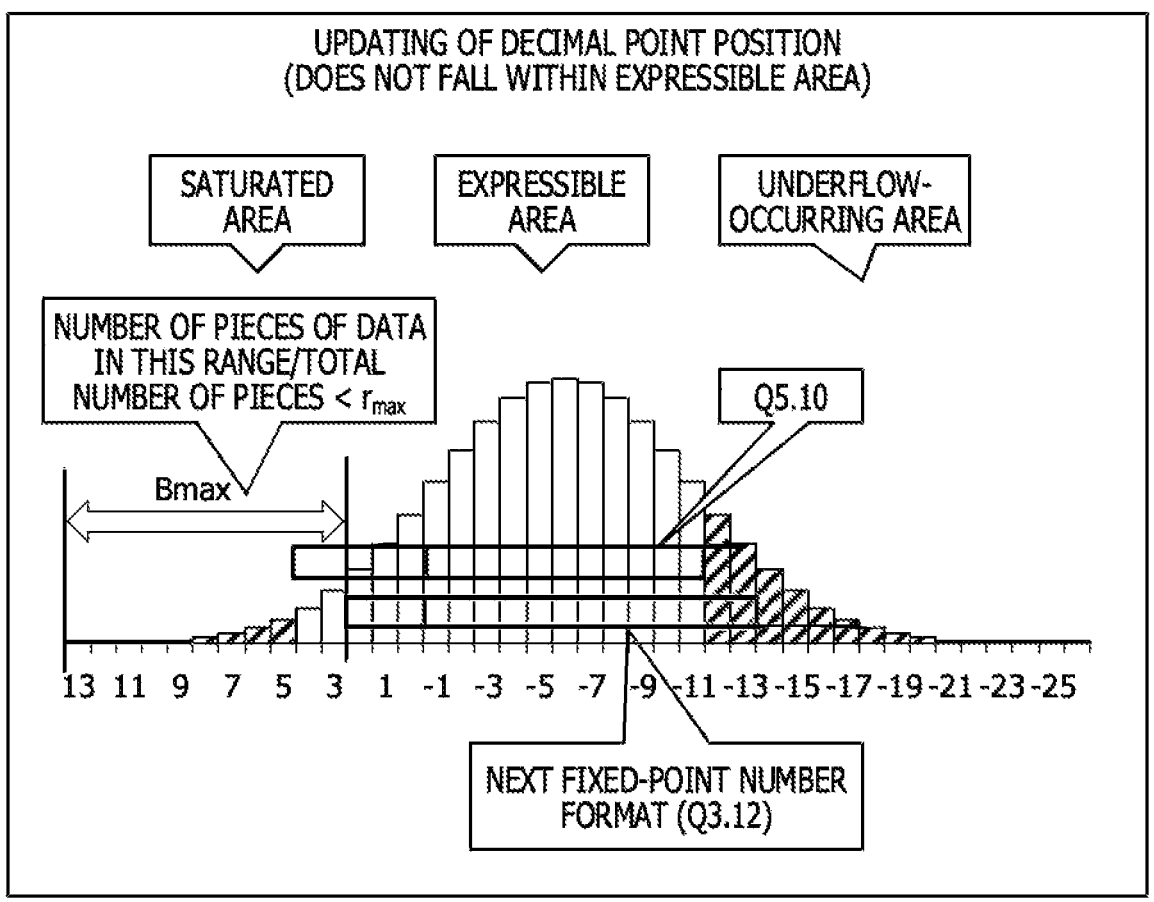
FIG. 10 is a diagram illustrating statistical information about the distribution of intermediate data and a decimal point position adjustment method based on the distribution.
Figure 11:
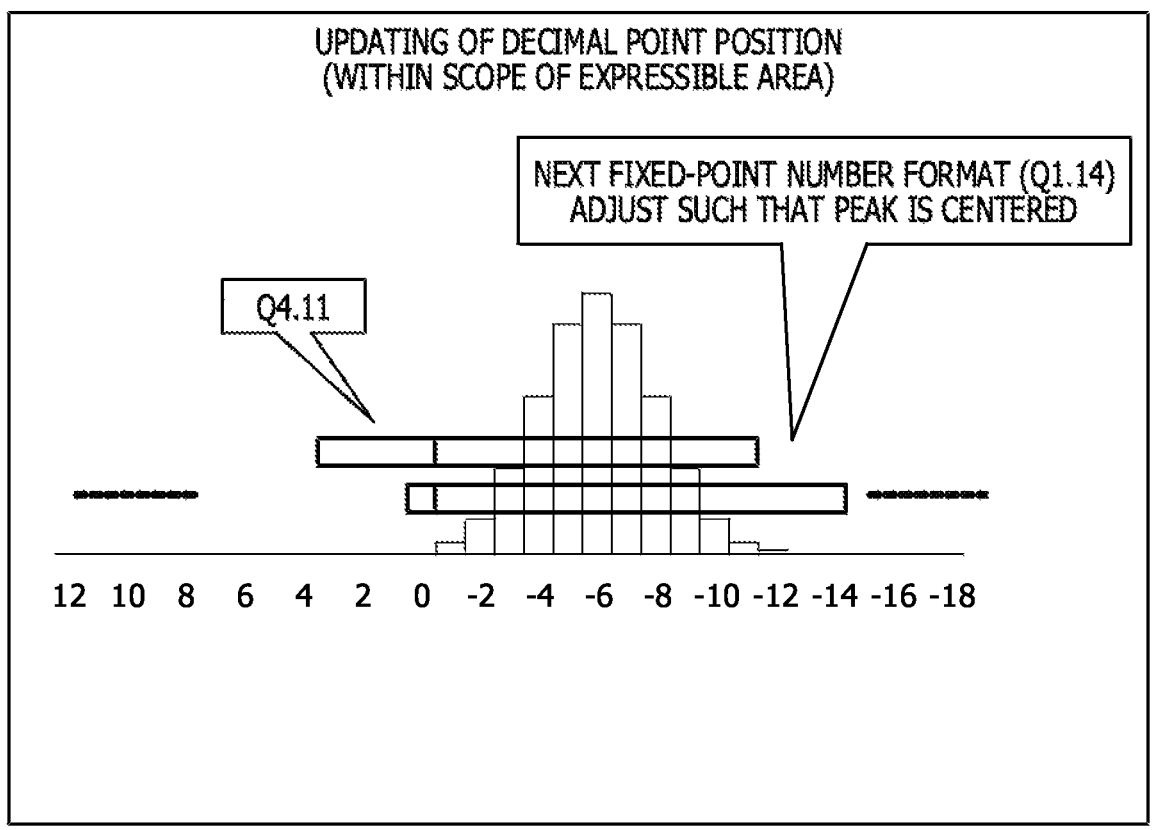
FIG. 11 is a diagram illustrating statistical information about the distribution of intermediate data and the decimal point position adjustment method based on the distribution.

FIGS. 10 and 11 are diagrams illustrating statistical information about the distribution of intermediate data and a decimal point position adjustment method based on the distribution. As described later, the DNN processor 43 has the fixed-point computator, and the statistical information acquisition circuit that acquires statistical information about the distribution of effective bit of the intermediate data, such as an output of each computator and computation result data stored in the internal memory 45.

The statistical information about the distribution of effective bit of the intermediate data is as follows:

(1) Distribution of the most significant bit position that is not a sign (2) Distribution of the least significant bit position that is not zero (3) A maximum value of the most significant bit position that is not a sign (4) A minimum value of the least significant bit position that is not zero (1) The most significant bit position that is not a sign is the most significant bit position of effective bits of the intermediate data. Not a sign refers to "1" for a sign bit is 0 (positive), and "0" for the sign bit is 1 (negative). (2) The least significant bit position that is not zero means the effective least significant bit position of the intermediate data. It is the least significant bit position of "1" wherein the sign bit is 0 (positive), and is also the least significant bit position of "1" wherein the sign bit is 1 (negative). When the sign bit is 1, bits other than the sign bit are represented as two's complement, and processing of converting the two's complement into the original number includes subtracting 1 and inverting 1, 0 to 0, 1. Accordingly, the least significant bit of "1" becomes "0" by subtracting 1, and becomes "1" by bit inversion, and finally becomes the least significant bit position of effective bits.

(3) A maximum value of the most significant bit that is not a sign is the maximum position of the most significant bit position of effective bits of plurality of intermediate data. Similarly, (4) A minimum value of the least significant bit position that is not zero is a minimum position of the least significant bit position of effective bits of plurality of intermediate data.

FIGS. 10 and 11 illustrate exemplary histograms indicating the distribution of (1) the distribution of the most significant bit position that is not a sign. The bins of the histogram is Horizontal axis represents bins of the histogram in base-2 logarithmic scale, and each bin corresponds the effective most significant bit of the intermediate data, and the height of the bin indicates the number of intermediate data having the effective most significant bit of each bin. In the example illustrated in FIG. 10, the number of bins is 39 from −25 to +13.

The top bin in the distribution corresponds to (3) a maximum value of the most significant bit position that is not a sign.

In the case of the fixed-point number of 16 bits, the number of bits other than the sign bit is 15. The format of the fixed-point number is expressed as Qn·m. Qn·m means an n-bit integral part and an m-bit decimal part. The decimal point position is located between the integral part and the decimal part. When decimal point position and the bit width are fixed, determining the fixed-point number format having information about the number of bits representing the integral part and the number of bits representing the decimal part corresponds to determining the decimal point position of digits of data. Determining the fixed-point number format corresponds to, when intermediate data that is the computation result is stored as an output, limiting the output to a smaller bit width than the intermediate data. The digit range that is expressible without any saturation and omission in limiting the bit width of the computation result data is referred to as bit range in the present embodiment.

A range (the number of bins in the histogram) of the distribution of the most significant bit position that is not a sign changes depending on a plurality of intermediate data. In the extent of the distribution in the histogram in FIG. 10, the number of bins (the bin of −22 to the bin of +10) becomes 22+10+1=33, which does not fall within 15 bits of the fixed-point number (area that is expressible as the fixed-point number). Upper bits than 15 bits in the expressible area become an overflow and saturated, while low-order bits become an underflow and are omitted. In the histogram in FIG. 11, the number of bins (the bin of −13 to the bin of −2) becomes 12, which falls within 15 bits of the fixed-point number.

Thus, the decimal point position determination method based on statistical information that is histogram varies depending whether the horizontal width (the number of bins) of the histogram exceeds 15 bits and does not fall within the expressible area (15 bits) (FIG. 10) or falls within the expressible area (FIG. 11).

When the horizontal width (the number of bins) 33 in the histogram in FIG. 10 exceeds 15 bits and does not fall within the expressible area (15 bits), the fixed-point number format (decimal point position) is determined as follows. That is, the maximum number of bits Bmax on the high-order bit side, the ratio of the number of data on the high-order bit side to the total number of data in the histogram being less than a predetermined threshold value r_max, is determined, and the fixed-point number format is determined on the low-order bit from the determined Bmax. As illustrated in FIG. 10, bins are included on the high-order side from the determined Bmax, that is, data that is inexpressible in the newly determined fixed-point number format is present. In FIG. 10, data areas that are inexpressible in the current fixed-point number format are indicated as hatched bins. According to the method of determining the decimal point position in the present embodiment, by allowing data overflow, outlier data of the most significant bit position located on the excessive high-order side may be ignored, increasing the number of data within the expressible area.

In the example illustrated in FIG. 10, the existing fixed-point number format Q5.10 contains bits from −10 to +4, while the updated fixed-point number format Q3.12 is changed to contain bit from −12 to +2. Due to this change, values of the most significant bit of effective bits from +3 to +10 intermediate data are saturated by overflow, while at least the most significant bits of effective bits of −11, −12 of intermediate data are not omitted.

In the example illustrated in FIG. 11, since the existing fixed-point number format Q4.11 is shifted to the high-order bit side in the histogram, the updated fixed-point number format is changed to Q1.14. In Q1.14, the central bit in the format Q1.14 is located at a peak in the histogram. At least the most significant bits of effective bits of −12, −13, −14 of intermediate data are not omitted.

Figure 12:
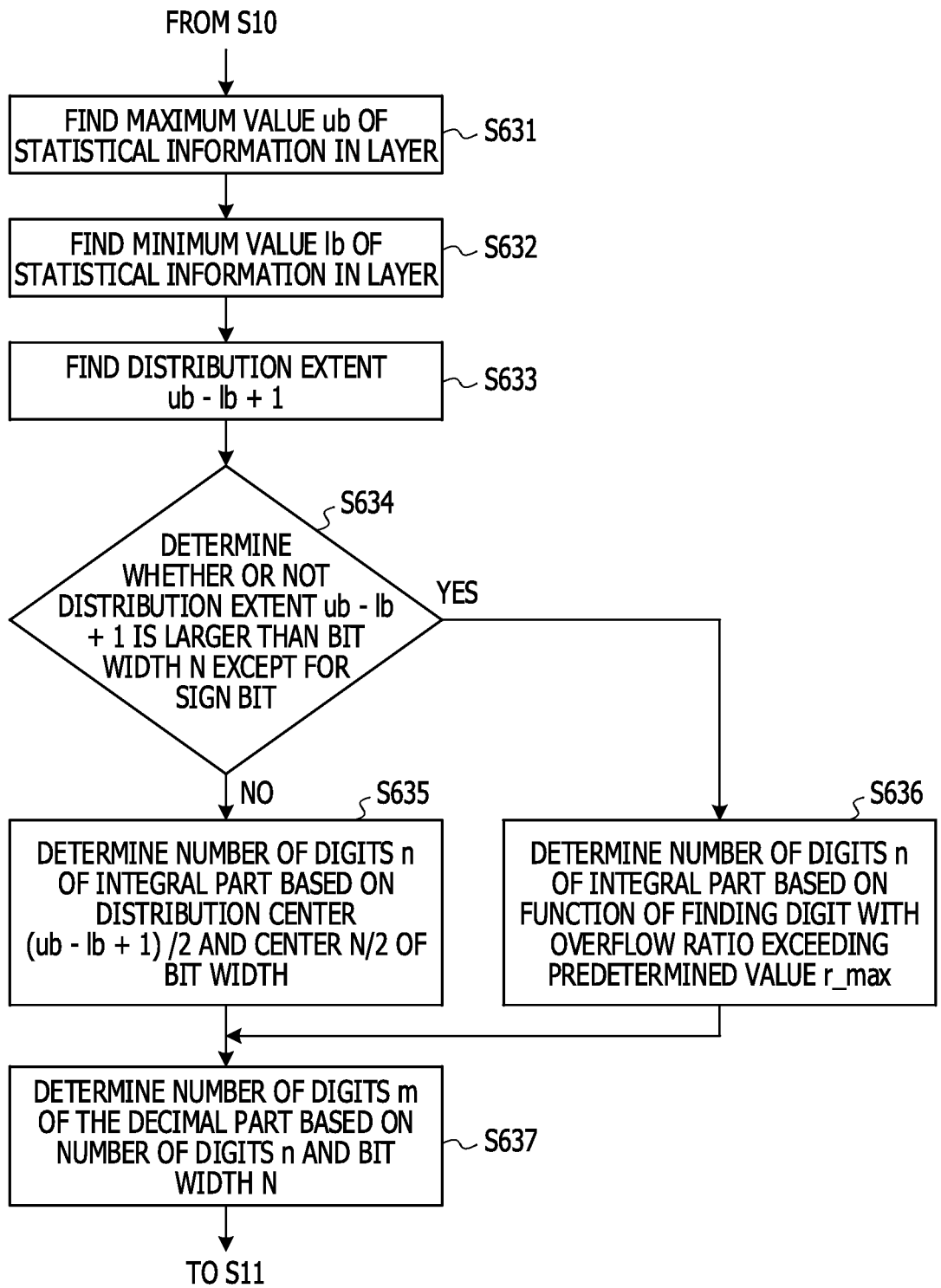
FIG. 12 is a flow chart of detailed processing in S63 in the flow chart illustrated in FIG. 7.

FIG. 12 is a flow chart of detailed processing in S63 in the flow chart illustrated in FIG. 7. In the detailed processing in S63, the fixed-point position of each intermediate data in the DNN is adjusted based on the statistical information about the distribution of intermediate data determined according to conditions. The whole of the detailed processing in S63 described below with reference to FIG. 12 may be executed by a host-processor 31 of the host machine 30, or a part of the processing by the DNN processor 43 of the DNN execution machine 40.

Processing starts when S10 is finished, a maximum value ub of statistical information is found from the statistical information in each layer, which is stored in S61 (S631). The maximum value ub of the statistical information corresponds to, for example, a maximum value of the above-mentioned most significant bit position that is not a sign. Next, a minimum value lb is found from the statistical information in each layer, which is stored in S61 (S632). The minimum value lb of the statistical information corresponds to, for example, a minimum value of the most significant bit position that is not a sign. Next, the distribution extent ub−lb+1 (S633). ub−lb+1 indicates a width between the maximum value and the minimum value of the statistical information. Next, it is determined whether or not the distribution extent ub−lb+1 is larger than a bit width N except for the sign bit (S634). This determination corresponds to classification into the case where the horizontal width (the number of bins) of the histogram does not fall within the expressible area (FIG. 10) or the case where the horizontal width falls within the expressible area (FIG. 11).

When the distribution extent ub−lb+1 is not larger than the bit width N except for the sign bit (S634: NO), the number of digits n of the integral part is determined based on the distribution center (ub−lb+1)/2 and the center N/2 of the bit width (S635). The number of digits n of the integral part corresponds to the integral part of n bits expressed in the fixed-point number format Qn·m. When the distribution extent is larger than the bit width N except for the sign bit (S634: YES), the number of digits n of the integral part is determined based on the function of finding the digit with overflow ratio exceeding the predetermined value r_max (S636). Next, the number of digits m of the decimal part is determined based on the number of digits n and the bit width N of the integral part, which is found in S635 or S636 (S637). The number of digits m of the integral part corresponds to the decimal part of m bits expressed in the fixed-point number format Qn·m.

Adjustment of Fixed-point Position in Deep Learning in First Embodiment

A statistical information acquisition method in deep learning in accordance with a first embodiment will be described below with reference to FIGS. 13 to 16B.

The deep learning in accordance with the first embodiment has a dropout layer Dropout as a layer in the DNN. In the deep learning in accordance with the first embodiment, when the fixed-point position in the dropout layer Dropout is adjusted, the fixed-point position is adjusted based on the statistical information acquired in a preceding layer of the dropout layer Dropout. In the deep learning in accordance with the first embodiment, the acquisition of statistical information in the dropout layer Dropout may be omitted, effectively reducing the computation amount.

Figure 13:
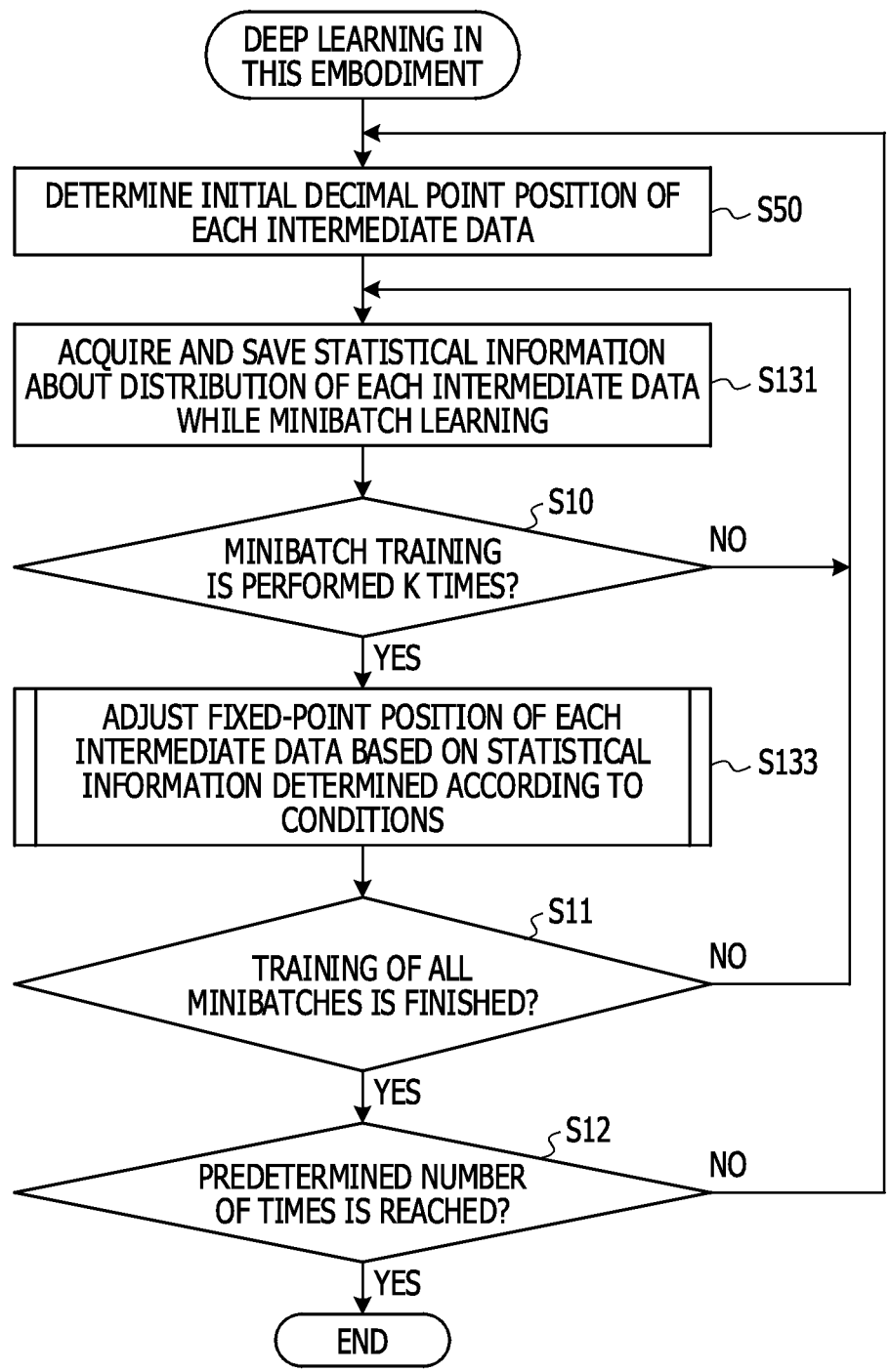
FIG. 13 is a flow chart of the deep learning in accordance with the present embodiment.

FIG. 13 is a flow chart of deep learning in the present embodiment. The deep learning in accordance with the present embodiment and the deep learning described in FIG. 7 are the same in the processing using common reference numerals, but are different in following points. In place of the processing S61 of acquiring and saving the distribution of values of each intermediate data in each layer as the statistical information in the flow chart described in FIG. 7, statistical information in each layer is acquired and saved, but statistical information in a certain layer is not acquired (S131). In place of the processing S63 of adjusting the fixed-point position in each layer based on each statistical information in each layer in the flow chart described in FIG. 7, the fixed-point number position in each layer is adjusted based on statistical information according to conditions (S133).

The dropout layer is a layer intended to prevent overfitting of the DNN by setting the output in the preceding layer to 0 according to a dropout ratio and multiplying remaining output by a constant according to the dropout ratio. A processing circuit that executes the processing in the dropout layer is included in the DNN processor 43. In the processing in the dropout layer Dropout, a dropout ratio r is 1 and remaining output is 0 to create mask data m, and an output x in the preceding layer is subjected to multiplication or selection of value, and then, the resultant multiplication value is multiplied by a coefficient k to acquire an output y of the dropout layer Dropout. The coefficient k is expressed based on the dropout ratio r according to a below-mentioned equation (1).

$$k = \frac{1}{1-r} \tag{1}$$

When k is power of 2 ($2^q$: q is an integer), a value p corresponding to digit shift in binary number 2 may be used. The value p may be expressed based on the coefficient k according to a below-mentioned equation (2).

$$p = \text{celi}(\log_2 k) \tag{2}$$

Figure 14:
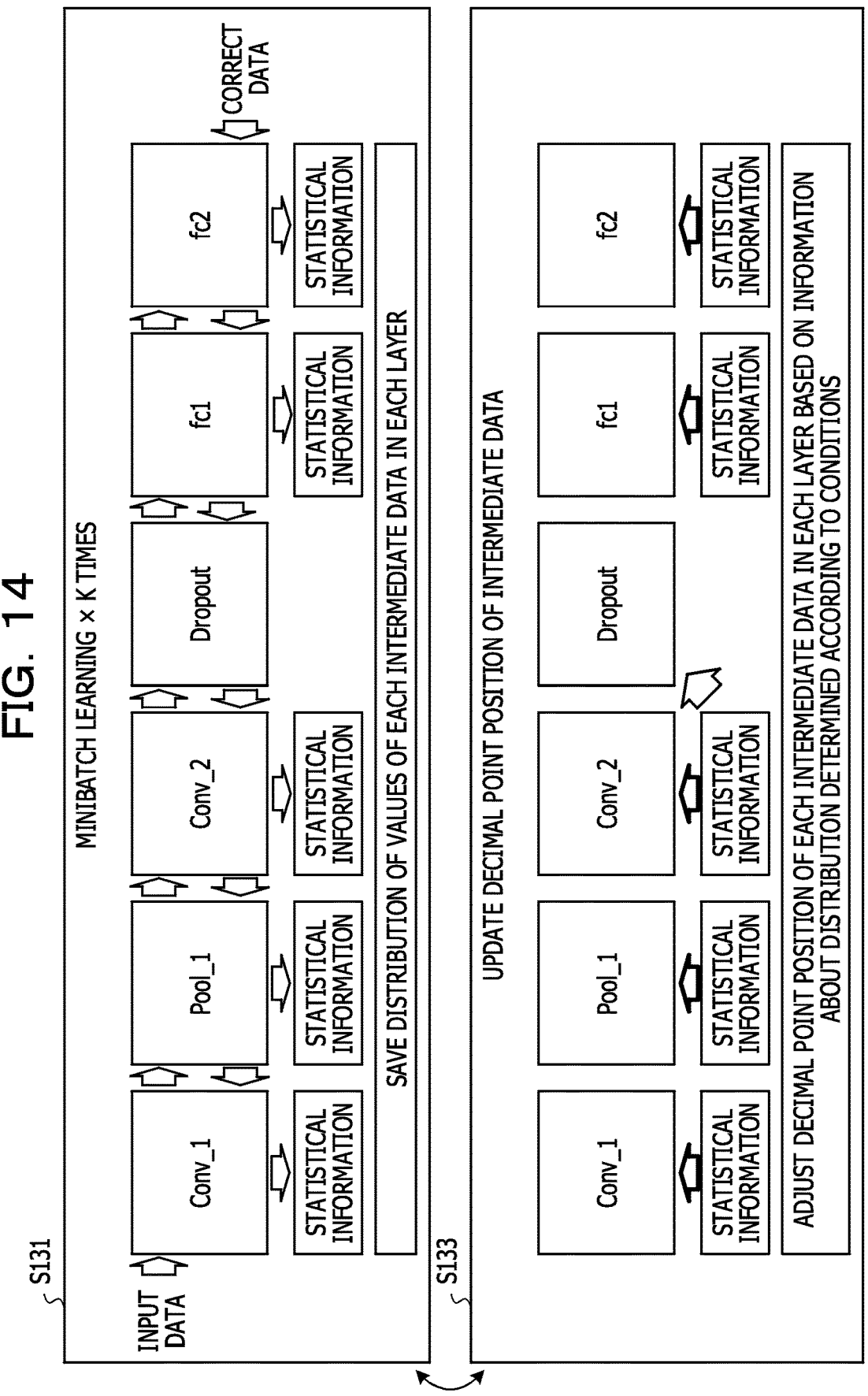
FIG. 14 is an explanatory diagram of a first example of details of S131 and S133 in the training process using the dynamic fixed-point number in FIG. 13 (first embodiment)

FIG. 14 is an explanatory diagram of a first example of detailed processing in S131 and S133 in the training process using the dynamic fixed-point number in FIG. 13.

Figure 15:
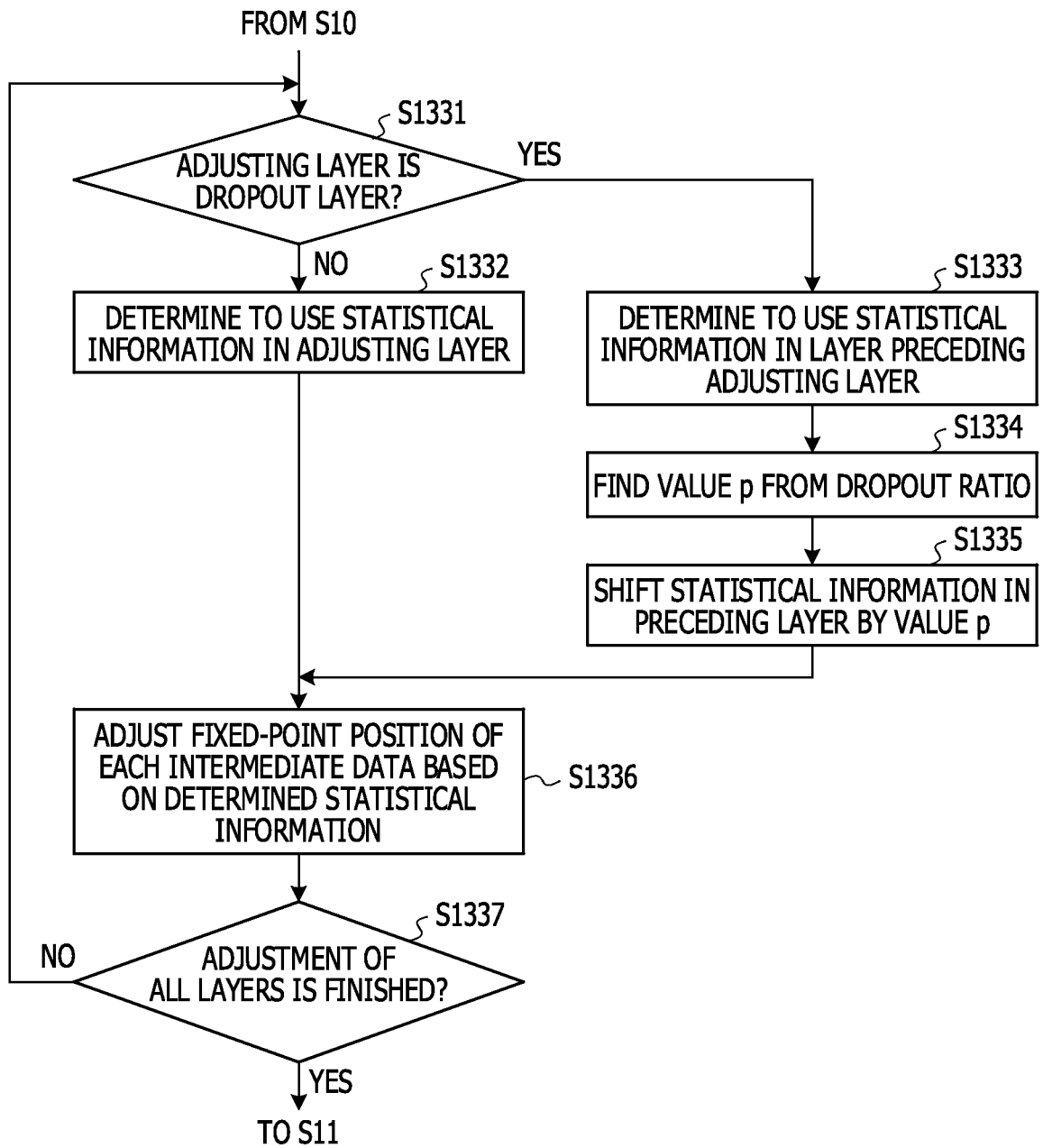
FIG. 15 is a flow chart of the first example of detailed processing in S133 in the flow chart illustrated in FIG. 13 (first embodiment)

FIG. 15 is a flow chart illustrating the first example of detailed processing in S133 in the flow chart in FIG. 13. The whole of the processing of S133 described in FIG. 15 may be executed by the DNN execution machine 40, or a part of the processing may be executed by the host machine 30.

The processing is started when the processing S10, and it is determined whether or not a layer that adjusts the fixed-point position is the dropout layer (S1331). When the layer that adjusts the fixed-point position is not the dropout layer (S1331: NO), it is determined to use the statistical information in the adjusting layer for following processing (S1332). When the adjusting layer is the dropout layer (S1331: YES), it is determined to use statistical information in a layer preceding the adjusting layer for following processing (S1333). The layer preceding layer preceding the adjusting layer is a layer closer to the input layer than the adjusting layer in the forward propagation processing, and a layer closer to the output layer than the adjusting layer in the backward propagation processing. Next, a value p is found from a dropout ratio k used in the processing in the dropout layer (S1334). As described above, the value p is a value corresponding to digit shift in binary number. Next, statistical information is shifted using the value p found in S1334, and it is determined to use the shifted statistical information in following processing (S1335). The shift of the statistical information corresponds to addition of the value p to the value of bin in the histogram.

Next, the fixed-point position of each intermediate data in each layer is adjusted based on the determined statistical information (S1336). S1336 is the same as S63 described in FIGS. 7 and 12 except that the statistical information determined according to conditions is used.

Until the adjustment of the fixed-point position in all layers is finished (S1337: NO), the processing S1331 to S1336 is repeated. When the adjustment of the fixed-point position in all layers is finished (S1337: YES), the processing proceeds to S11.

Figure 16A:
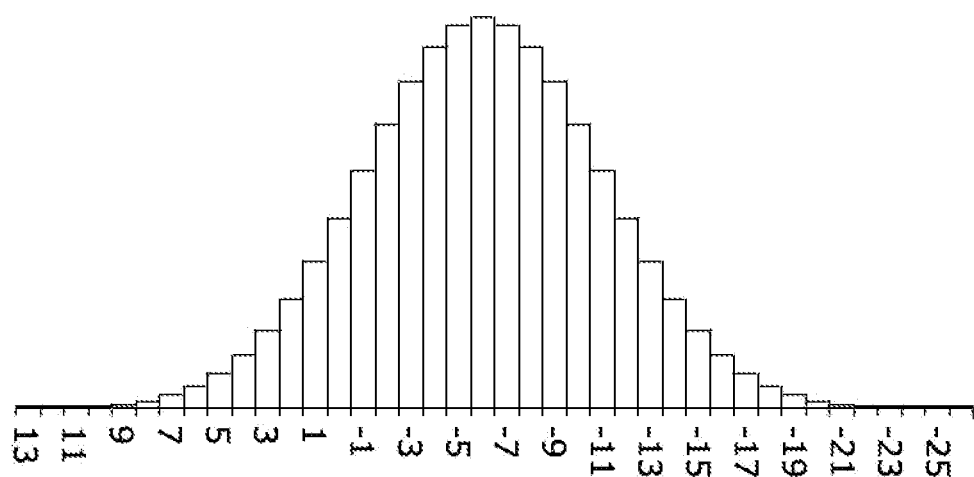
FIGS. 16A and 16B are diagrams illustrating an example of the distribution of the most significant bit position before and after processing in a dropout layer.
Figure 16B:
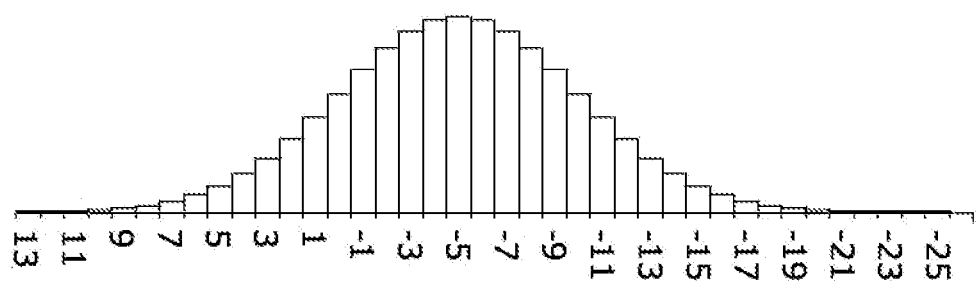

FIGS. 16A and 16B are diagrams illustrating an example of the distribution of the most significant bit position before and after processing in the dropout layer. Using the above-mentioned processing circuit, the dropout layer executes computation according to a predetermined rule. According to the predetermined rule of the dropout layer, with respect to the output in the preceding layer, data corresponding to the dropout ratio r is multiplied by 0 to output the multiplied data, and remaining data is multiplied by k to output the multiplied data. A change in data due to the processing, that is, a change in the distribution of the most significant bit position before and after the processing in the dropout layer may be predicted according to the predetermined rule.

In the processing in the dropout layer, with respect to the output in the preceding layer (Conv_2 in the example illustrated in FIG. 14), data corresponding to the dropout ratio r is multiplied by 0, and remaining data is multiplied by the coefficient k. Irrespective of data input from the preceding layer, a change in the number of digits of data due to the multiplied coefficient k, that is, the number of digits by which the distribution of the most significant bit position is shifted may be predicted based on the value p in the above equations (1) and (2). For example, when the dropout ratio r is 1/2, the coefficient k becomes 2, and the value p becomes 1. The histogram in FIG. 16A represents the distribution of the most significant bit position of data before the processing in the dropout layer. The histogram in FIG. 16B represents the distribution of the most significant bit position of data after the processing in the dropout layer. As compared to the histogram in FIG. 16A, in the histogram in FIG. 16B, the height of all bins become half, and all bins are shifted to the high-order side by one digit. A change in the height of bin is a change in the number of data in each bin, and corresponds to multiplication by the dropout ratio r=1/2. The shift of the bin indicates a change in the most significant bit position of data along the horizontal axis, and means that the digit of the most significant bit is shifted to the high-order side by one digit by multiplying remaining data by the coefficient k=2.

The histogram in FIG. 16A corresponds to statistical information about intermediate data in the layer preceding the dropout layer (Conv_2 in the example illustrated in FIG. 14). The histogram in FIG. 16B corresponds to a shift from the histogram in FIG. 16A by the value p. A maximum value and a minimum value of the distribution hardly change due to the change in the height of the bin. Thus, the most significant bit of data processed in the dropout layer exhibits the same trend as that in the histogram in FIG. 16B. A proper point position may be set based on second statistical information acquired by shifting statistical information in the layer preceding the dropout layer by the value p. Thus, acquisition of statistical information in the dropout layer may be omitted. Setting the proper point position may efficiently reduce the computation amount while keeping the computation accuracy.

Configuration of Fixed-point DNN Processor and Acquisition of Statistical Information Next, the configuration of the fixed-point DNN processor 43 and acquisition of statistical information in accordance with the present embodiment will be described.

Figure 17:
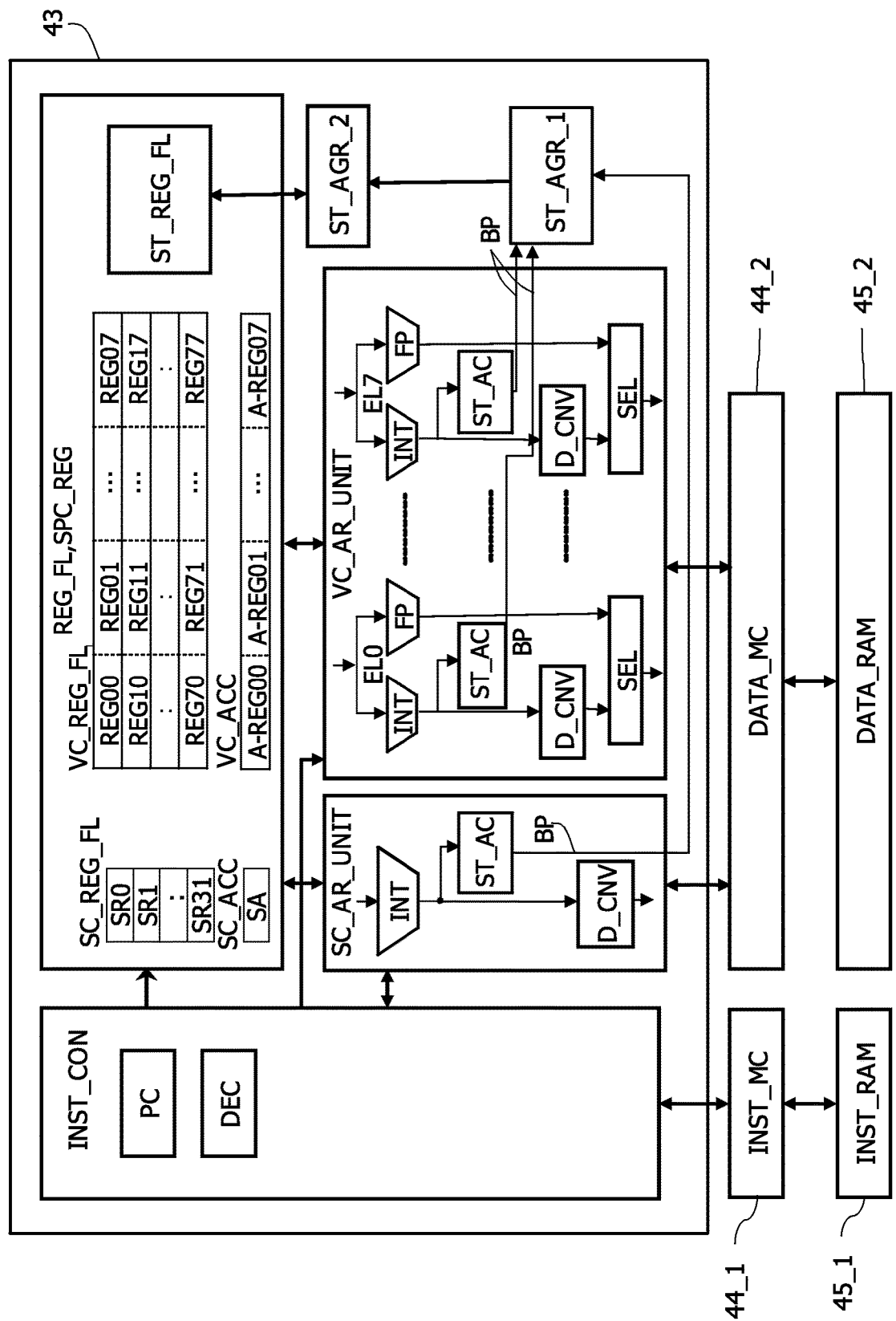
FIG. 17 is a diagram illustrating an example of the configuration of a DNN processor.

FIG. 17 is a diagram illustrating an example of the configuration of the DNN processor 43. The DNN processor 43 includes an instruction control unit INST_CON, a register file REG_FL, a special register SPC_REG, a scalar computation unit SC_AR_UNIT, a vector computation unit VC_AR_UNIT, and statistical information aggregators ST_AGR_1, ST_AGR_2.

The DNN processor 43 includes an integer computator INT that computes the fixed-point number and a floating-point computator FP that computes the floating point number in the vector computation unit VC_AR_UNIT. That is, the DNN processor 43 includes the DNN processor 43_1 that executes the fixed-point computation and the DNN processor 43_2 that executes the floating-point computation.

An instruction memory 45_1 and a data memory 45_2 are coupled to the DNN processor 43 via the memory access controller 44. The memory access controller 44 has an instruction memory access controller 44_1 and a data memory access controller 44_2.

The instruction control unit INST_CON has, for example, a program counter PC and an instruction decoder DEC. The instruction control unit INST_CON fetches an instruction from the instruction memory 45_1 based on the address of the program counter PC, decodes the instruction fetched from the instruction decoder DEC, and issues the decoded instruction to a computation unit.

The register file REG_FL has a scalar register file SC_REG_FL and a scalar accumulation register SC_ACC, which are used by the scalar computation unit SC_AR_UNIT. The register file REG_FL has a vector register file VC_REG_FL and a vector accumulation register VC_ACC, which are used by the vector computation unit VC_AR_UNIT.

The scalar register file SC_REG_FL has, for example, 32-bit scalar registers SR0-SR31 and the 32 bit+α bit scalar accumulation register SC_ACC.

The vector register file VC_REG_FL has, for example, 8 sets of REG00-REG07 to REG70-REG77 each having 32-bit 8-element registers REGn0-REGn7. The vector accumulation register VC_ACC has, for example, A_REG0 to A_REG7 each having 8-element 32 bit+α bit register.

The scalar computation unit SC_AR_UNIT has a set of an integer computator INT, a data converter D_CNV, and a statistical information acquisitor ST_AC. The data converter D_CNV converts output data of the fixed-point number output from the integer computator INT into the floating point number. The scalar computation unit SC_AR_UNIT uses the scalar registers SR0-SR31 and the scalar accumulation register SC_ACC in the scalar register file SC_REG_FL to perform computation. For example, the integer computator INT computes input data stored in any of the scalar registers SR0-SR31, and stores the output data in another register. When executing a product-sum computation, the integer computator INT also stores a result of the product-sum computation in the scalar accumulation register SC_ACC. The computation result of the scalar computation unit SC_AR_UNIT is stored in any of the scalar register file SC_REG_FL, the scalar accumulation register SC_ACC, or the data memory 45_2.

The vector computation unit VC_AR_UNIT has 8-element (element) computation units EL0-EL7. The elements EL0-EL7 each have the integer computator INT, the floating-point computator FP, and the data converter D_CNV. For example, the vector computation unit inputs one of the sets of 8-element registers REGn0-REGn7 in the vector register file VC_REG_FL, executes computation in parallel by the 8-element computators, and stores the computation results in another set of 8-element registers REGn0-REGn7.

As a result of computation, the data converter D_CNV shifts the fixed-point number data acquired from a reading result from the data memory 45_2. The data converter D_CNV shifts the fixed-point number data by a shift amount S designated in the instruction fetched by the instruction decoder DEC. The shift of the data converter D_CNV corresponds to adjustment of the decimal point position corresponding to the fixed-point number format. The data converter D_CNV also executes such shift as well as saturation of high-order bits of the fixed-point number data and rounding of low-order bits. The data converter D_CNV includes a rounding unit that receives an input as a 40-bit computation result and rounds low-order bits as decimal part, a shifter that executes arithmetic shift, and a saturation unit that executes saturation processing.

At shift to left, the data converter D_CNV maintains the sign of the high-order bits, and in the saturation processing, that is, when overflow occurs, replaces the value of bits other than the sign bit with a positive maximum value when the sign bit is positive and with a negative maximum value when the sign bit is negative. At shift to right, the data converter D_CNV also embeds the sign bit in high-order bits (lower than the sign bit). The data converter D_CNV output data acquired in the rounding, shift, and saturation processing as described above, with the same bit width as the registers of the register file REG_FL. A data conversion unit is an example of a circuit that adjusts the decimal point position of fixed-point number data.

The vector computation unit VC_AR_UNIT also performs product-sum computation using the 8-element computators, and stores accumulated values of the product-sum results in respective 8-element registers A_REG0 to A_REG7 in the vector accumulation register VC_ACC.

For the vector registers REGn0-REGn7 and the vector accumulation registers A_REG0 to A_REG7, the number of computation elements increases 8, 16, 32 as the number of bits of data to be computed is 32 bits, 16 bits, 8 bits.

The vector computation unit VC_AR_UNIT has eight statistical information acquisitors ST_AC that acquire statistical information of output data from the respective 8-element integer computators INT. The statistical information is information about the most significant bit position that is not a sign of the output data from the integer computator INT. The statistical information is acquired as a bit pattern BP described later with reference to FIG. 20. The statistical information acquisitor ST_AC may input data in the data memory 45_2, the scalar register file SC_REG_FL, and the scalar accumulation register SC_ACC, in addition to the output data of the integer computator INT, and acquire the statistical information.

Figure 23:
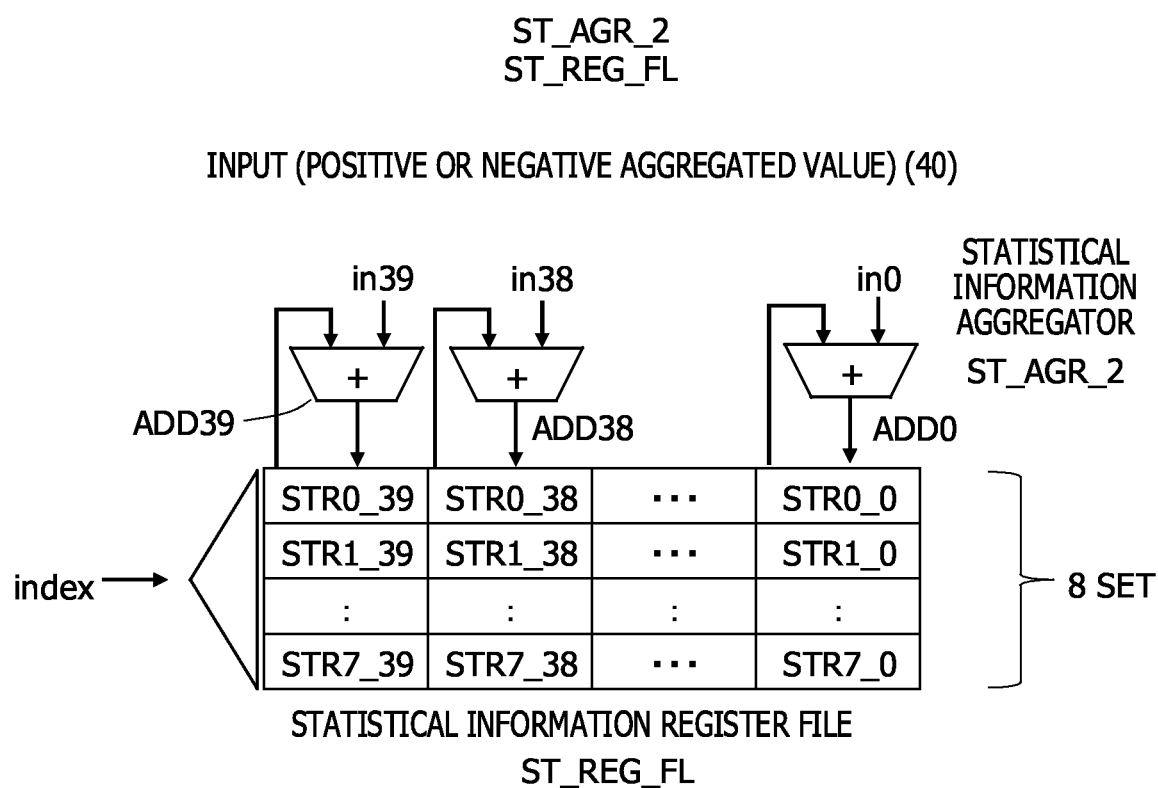
FIG. 23 is a diagram illustrating an example of a second statistical information aggregator and a statistical information register file.

As illustrated in FIG. 23, the statistical information register file ST_REG_FL includes 8 sets of STR0_0-STR0_39 to STR7_0-STR7_39 having, for example, 32-bit×40-element statistical information registers STR0-STR39.

The scalar registers SR0-SR31 stores addresses and parameters of the DNN. The vector registers REG00-REG07 to REG70-REG77 stores input data and output data of the vector computation unit VC_AR_UNIT. The vector accumulation register VC_ACC stores multiplication results and addition results of the vector registers.

The statistical information registers STR0_0-STR0_39 to STR7_0-STR7_39 stores the number of data belonging to plurality of bins of eight or less types of histograms. When the output data from the integer computator INT is 40 bits, for each of the 40 bits, the number of data having the most significant bit that is not a sign is stored in, for example, statistical information registers STR0_0-STR0_39.

The scalar computation unit SC_AR_UNIT has four fundamental computation, shift computation, branch, load, and store. As described above, the scalar computation unit SC_AR_UNIT includes the statistical information acquisitors ST_AC that acquire statistical information having the most significant bit position that is not a sign from output data from the integer computator INT.

The vector computation unit VC_AR_UNIT executes floating-point computation, integer computation, and product-sum computation using the vector accumulation register VC_ACC. The vector computation unit VC_AR_UNIT also performs clearing of the vector accumulation register VC_ACC, product-sum computation (multiply and accumulate: MAC), cumulative addition, and transfer to the vector register file VC_REG_FL. Further, the vector computation unit VC_AR_UNIT performs load and store. As described above, the vector computation unit VC_AR_UNIT includes the statistical information acquisitors ST_AC that acquire statistical information having the most significant bit position that is not a sign from output data from each of the 8-element integer computators INT.

Acquisition, Aggregation, and Storage of Statistical Information

Next, acquisition, aggregation, and storage of statistical information about computation output data by the DNN processor 43 will be described. The acquisition, aggregation, and storage of statistical information is performed by the DNN processor 43 using an instruction transmitted from the host processor 31 as a trigger. Accordingly, the host processor 31 transmits the instruction to perform acquisition, aggregation, storage of statistical information in addition to a computation instruction in each layer of the DNN to the DNN processor 43. Alternatively, for computation in each layer, the host processor 31 transmits a computation instruction with the processing of acquisition, aggregation, storage of statistical information to the DNN processor 43.

Figure 18:
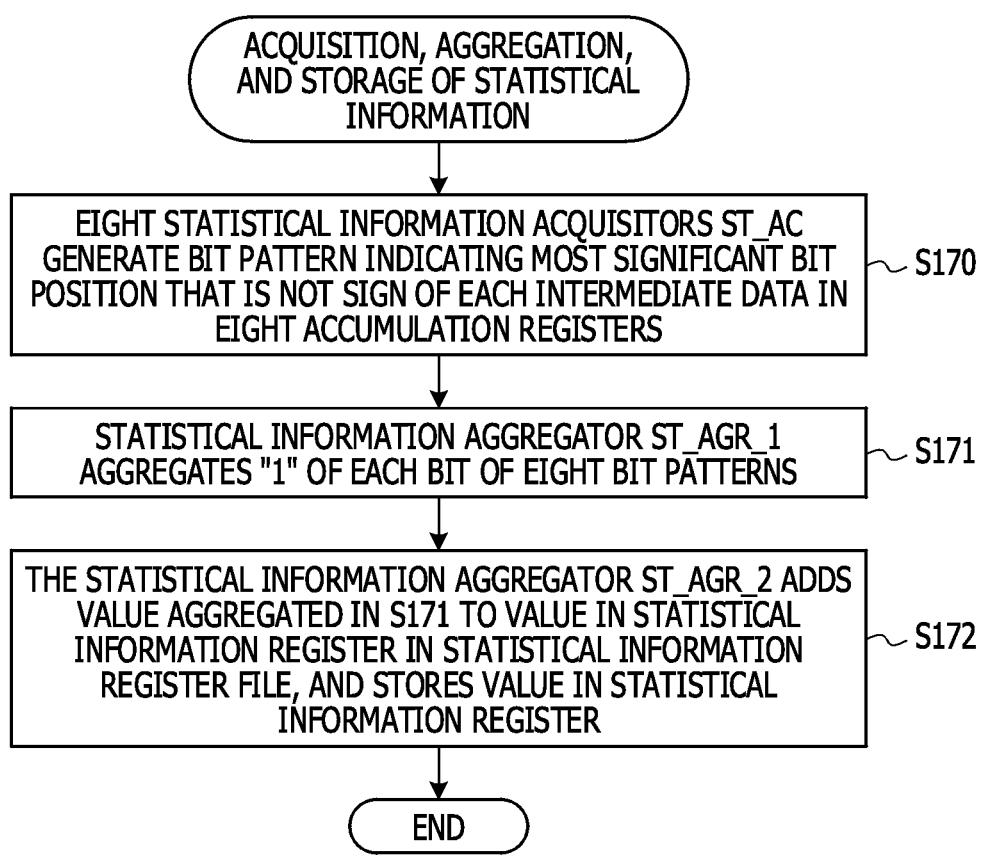
FIG. 18 is a flow chart illustrating acquisition, aggregation, storage of statistical information by the DNN processor.

FIG. 18 is a flow chart illustrating acquisition, aggregation, storage processing of statistical information of the DNN processor 43. First, eight statistical information acquisitors ST_AC in the vector computation unit VC_AR_UNIT each output a bit pattern indicating the most significant bit position that is not a sign of intermediate data acquired by the computation in each layer from the integer computator INT (S170). The bit pattern will be described later.

Next, the statistical information aggregator ST_AGR_1 aggregates "1" of each bit of the eight bit patterns (S171).

The statistical information aggregator ST_AGR_2 adds the aggregated value in S171 to the value in the statistical information register in the statistical information register file ST_REG_FL, and stores the value in the statistical information register file ST_REG_FL (S172).

The above-mentioned processing S170, S171, and S172 is repeated at each generation of intermediate data computed in each layer by the eight elements EL0-EL7 in the vector computation unit VC_AR_UNIT.

In the processing of deep learning, when the above-mentioned acquisition, aggregation, storage of statistical information is completed for plurality of intermediate data in K minibatches, statistical information about the number of bins in the histogram of the most significant bit that is not a sign of plurality of intermediate data in K minibatches is stored in the statistical information register file ST_REG_FL. Thereby, the sum of the most significant bit position that is not a sign of in intermediate data in K minibatches is counted by bit. The decimal point position of each intermediate data is adjusted based on the statistical information.

The decimal point position of intermediate data in each layer is adjusted by, for example, the host processor 31 of the host machine 30. The statistical information in each layer stored in the statistical information registers STR0_0-STR0_39 is written to the data memory 45_2 of the host machine 30, and the host processor 31 executes a computation to execute the processing described in FIG. 12. The host processor 31 finds a difference between the newly determined decimal point position and the current decimal point position, and writes the difference in the data memory 45_2 as a shift amount S.

Acquisition of Statistical Information

Figure 19:
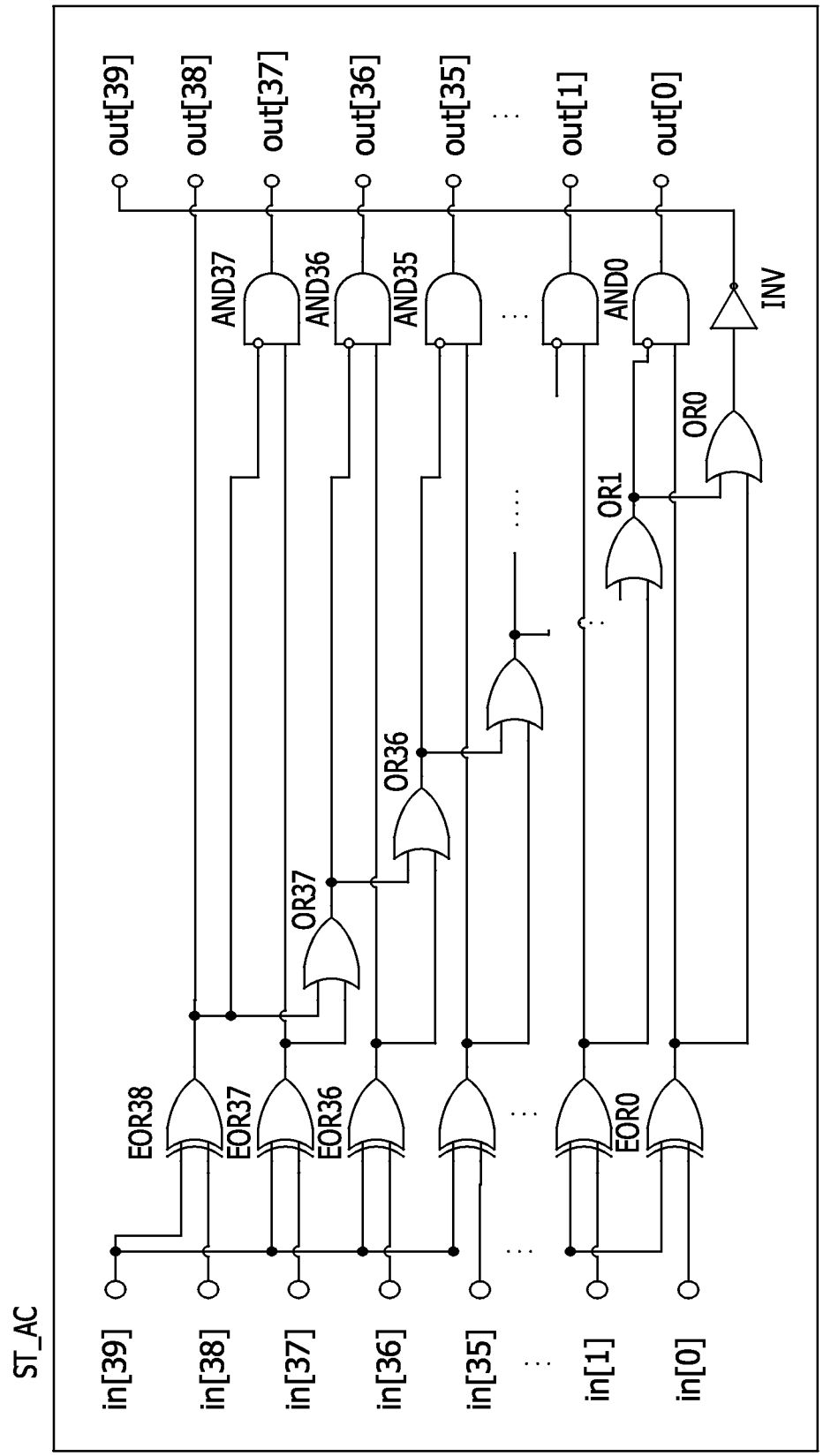
FIG. 19 is a diagram illustrating an example of a logic circuit of a statistical information acquisitor.
Figure 20:
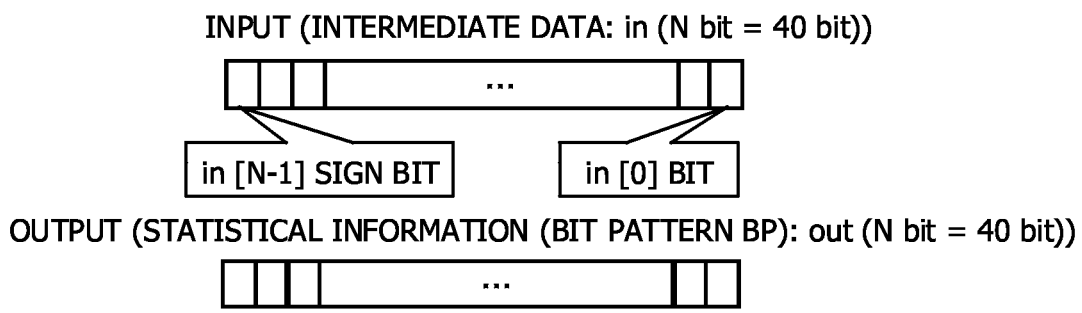
FIG. 20 is a diagram illustrating a bit pattern of computation output data acquired by the statistical information acquisitor.

FIG. 19 is a diagram illustrating an example of a logic circuit of a statistical information acquisitor ST_AC. FIG. 20 is a diagram illustrating a bit pattern BP of computation output data acquired by the statistical information acquisitor. The statistical information acquisitor ST_AC inputs N bits (N=40) of intermediate data (for example, computation output data of convolution in the forward propagation processing, and updated difference in error and weight in the backward propagation processing) in[39:0] output from the integer computator INT, and outputs a bit pattern output out[39:0] indicating the most significant bit position that is not a sign as "1" and others as "0".

As illustrated in FIG. 20, for the input in[39:0] that is intermediate data, the statistical information acquisitor ST_AC outputs the output out[39:0] that is "1" at the most significant bit position that is not a sign (1 or 0 that is different from the sign bit) and "0" at the other positions, as bit pattern BP. However, when all bits of the input in[39:0] are the same as the sign bit, the most significant bit is exceptionally set to "1". FIG. 20 illustrates a truth table of the statistical information acquisitor ST_AC.

According to the truth table, top two rows represents an example in which all bits of the input in[39:0] match the sign bit "1", "0", and the most significant bit out[39] of the output out[39:0] is "1" (0×8000000000). Next two rows represents an example in which 38 bit in[38] of the input in[39:0] is different from the sign bit "1", "0", and 38 bit out[38] of the output out[39:0] is "1" and others are "0". Bottom two rows represents an example in which the 0 bit in[0] of the input in[39:0] is different from the sign bit "1", "0", and 0 bit out[0] of the output out[39:0] is "1" and others are "0".

The logic circuit diagram illustrated in FIG. 19 detects the most significant bit position that is not a sign as follows. First, the sign bit in[39] does not match in[38], an output of an E0R38 becomes "1", and the output out[38] becomes "1". When the output of the E0R38 becomes "1", the other outputs out[39], out[38:0] become "0" through logical OR OR37-OR0, logical AND AND37-AND0, and an inversion gate INV.

When the sign bit in[39] matches in[38], and does not match in[37], the output of the E0R38 becomes "0", an output of an E0R37 becomes "1", and the output out[37] becomes "1". When the output of the E0R37 becomes "1", the other outputs out[39:38], out[36:0] become "0" through the logical OR OR36-OR0 and the logical AND AND36-AND0, and the inversion gate INV. The same applies hereafter.

As apparent from FIGS. 19 and 20, the statistical information acquisitor ST_AC outputs distribution information including the most significant bit position "1" or "0" that is different from the sign bit of intermediate data, which is a computed output, as the bit pattern BP.

Aggregation of Statistical Information

Figure 21:
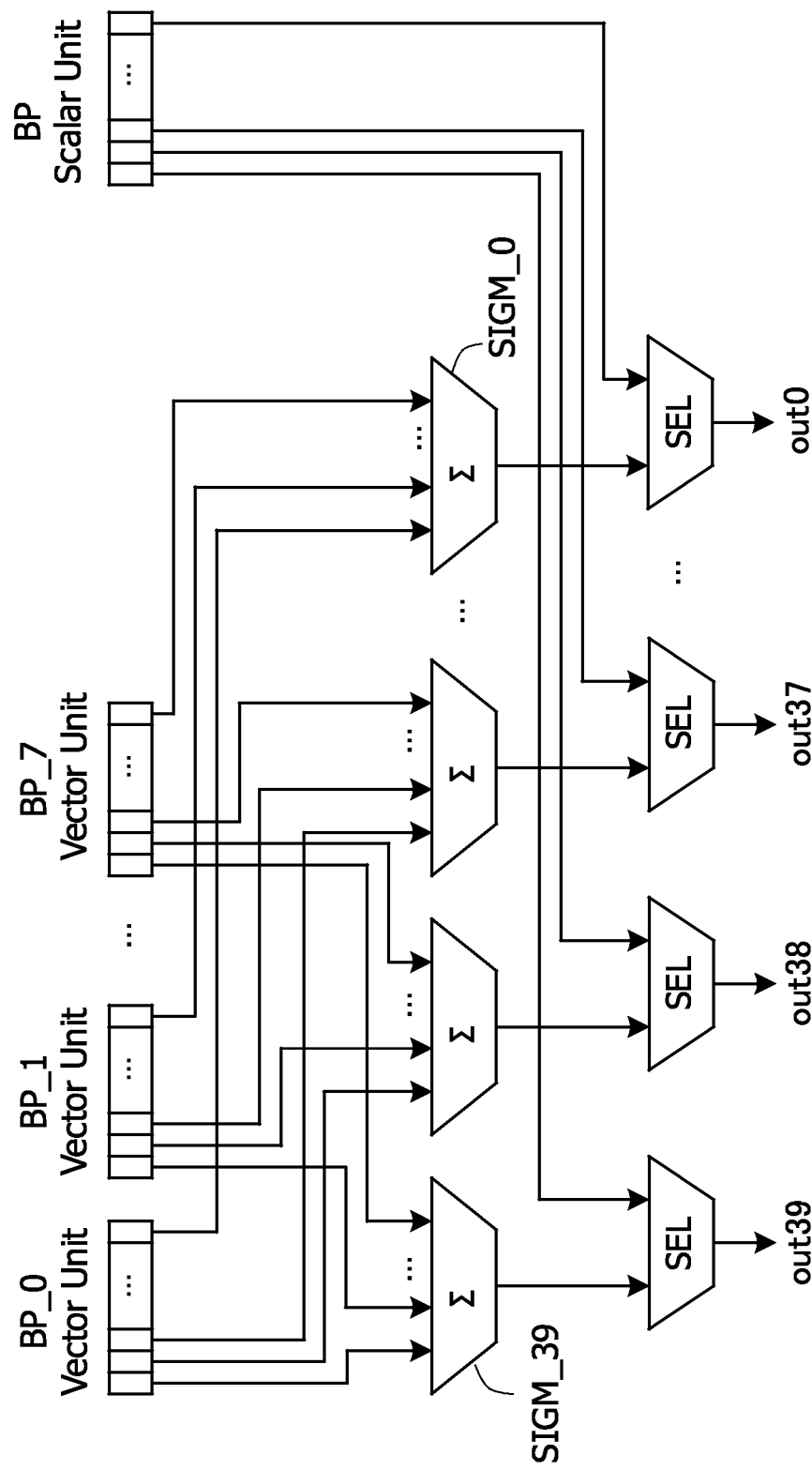
FIG. 21 is a diagram illustrating an example of a logic circuit of a statistical information aggregator.

FIG. 21 is a diagram illustrating an example of a logic circuit of the statistical information aggregator ST_AGR_1. FIG. 22 is an explanatory diagram of operation of the statistical information aggregator ST_AGR_1. The statistical information aggregator ST_AGR_1 inputs bit patterns BP_0 to BP_7 that are eight pieces of statistical information acquired by the vector computation unit VC_AR_UNIT, and outputs out0 to out39 to which "1" of each bit of the eight bit patterns BP_0 to BP_7 is added. The bit patterns BP_0 to BP_7 each have 40 bits, and out0 to out39 each have 4 bits, for example.

As illustrated in the logic circuit in FIG. 21, the statistical information aggregator ST_AGR_1 adds "1" of each bit of the bit patterns BP_0 to BP_7, which is acquired by each of the statistical information acquisitors ST_AC in the vector computation unit VC_AR_UNIT in the addition circuits SGM_0-SGM_39, and generates addition results as the outputs out0 to out39. As illustrated in FIG. 22, the outputs are out0 to out39. Each bit of the output is $\log_2$ (the number of elements=8)+1 bit so as to count the number of elements, and thus, 4 bits when the number of elements is 8.

The statistical information aggregator ST_AGR_1 may output one bit pattern BP acquired by the statistical information acquisitors ST_AC in the scalar computation unit SC_AR_UNIT as it is. For this reason, selectors SEL that each select an output of the addition circuits SGM_0-SGM_39 or the bit pattern BP of the scalar computation unit SC_AR_UNIT are provided.

FIG. 23 is a diagram illustrating an example of the second statistical information aggregator ST_AGR_2 and the statistical information register file ST_REG_FL. The second statistical information aggregator ST_AGR_2 adds the value of each bit of the output out0 to out39 aggregated by the first statistical information aggregator ST_AGR_1 to the value of one register set in the statistical information register file ST_REG_FL, and stores the added value.

The statistical information register file ST_REG_FL has, for example, 8 sets (n=0 to 7) of 40 32-bit registers STRn_39 to STRn_0. Accordingly, it may store 40 bins in each of eight types of histograms. It is assumed that statistical information to be aggregated is stored in the 40 32-bit registers STR0_39 to STR0_0 (n=0). The second statistical information aggregator ST_ARG_2 has adders ADD_39 to ADD_0 that add aggregated value in[39:0] aggregated by the first statistical information aggregator ST_AGR_1 to each of accumulated values stored in the 40 32-bit registers STR0_39 to STR0_0. Outputs of the adders ADD_39 to ADD_0 are re-stored in the 40 32-bit registers STR0_39 to STR0_0. Thereby, the number of samples of each bin in a target histogram is stored in the 40 32-bit registers STR0_39 to STR0_0.

Hardware circuits of the statistical information acquisitors ST_AC and the statistical information aggregators ST_AGR_1, ST_AGR_2 in the computation unit illustrated in FIGS. 17, 19, 21, and 23 may acquire the distribution (the number of samples of each bin in the histogram) of the most significant bit position that is not a sign (Leftmost set bit position for positive number and leftmost unset bit position for negative number) of intermediate data computed in each layer of the DNN.

In addition to the distribution of the most significant bit position that is not a sign, the distribution of the least significant bit position that is not zero may be acquired in the same manner by using the hardware circuit in the DNN processor 43. A maximum value of the most significant bit position that is not a sign and a minimum value of the least significant bit position that is not zero may be similarly acquired.

Since the statistical information may be acquired by the hardware circuit of the DNN processor 43, the fixed-point position of intermediate data in deep learning may be adjusted with a small number of man-hours.

Adjustment of Fixed-point Position in Deep Learning in Second Embodiment

A statistical information acquisition method in deep learning in accordance with a second embodiment will be described below with reference to FIGS. 24 and 25.

The deep learning in accordance with the second embodiment has a ReLU layer ReLU as a layer in the DNN. In the deep learning in accordance with the second embodiment, in adjusting the fixed-point position in the ReLU layer ReLU, the fixed-point position is adjusted based on the statistical information acquired in the layer preceding the ReLU layer ReLU. The deep learning in accordance with the second embodiment may omit acquisition of the statistical information in the ReLU layer ReLU, reducing the computation amount.

The rectified linear unit (ReLU) layer is a layer intended to reduce overfitting of the DNN by setting an output of less than 0 among outputs in the preceding layer to 0, and outputting an output of 0 or more as it is. A processing circuit that executes the processing in the ReLU layer is included in the DNN processor 43. In the processing in the ReLU layer ReLU, it is determined whether or not an output x in the preceding layer is 0 or more, and the output x or 0 is selected according to the determination result to acquire an output y in the ReLU layer ReLU.

Figure 24:
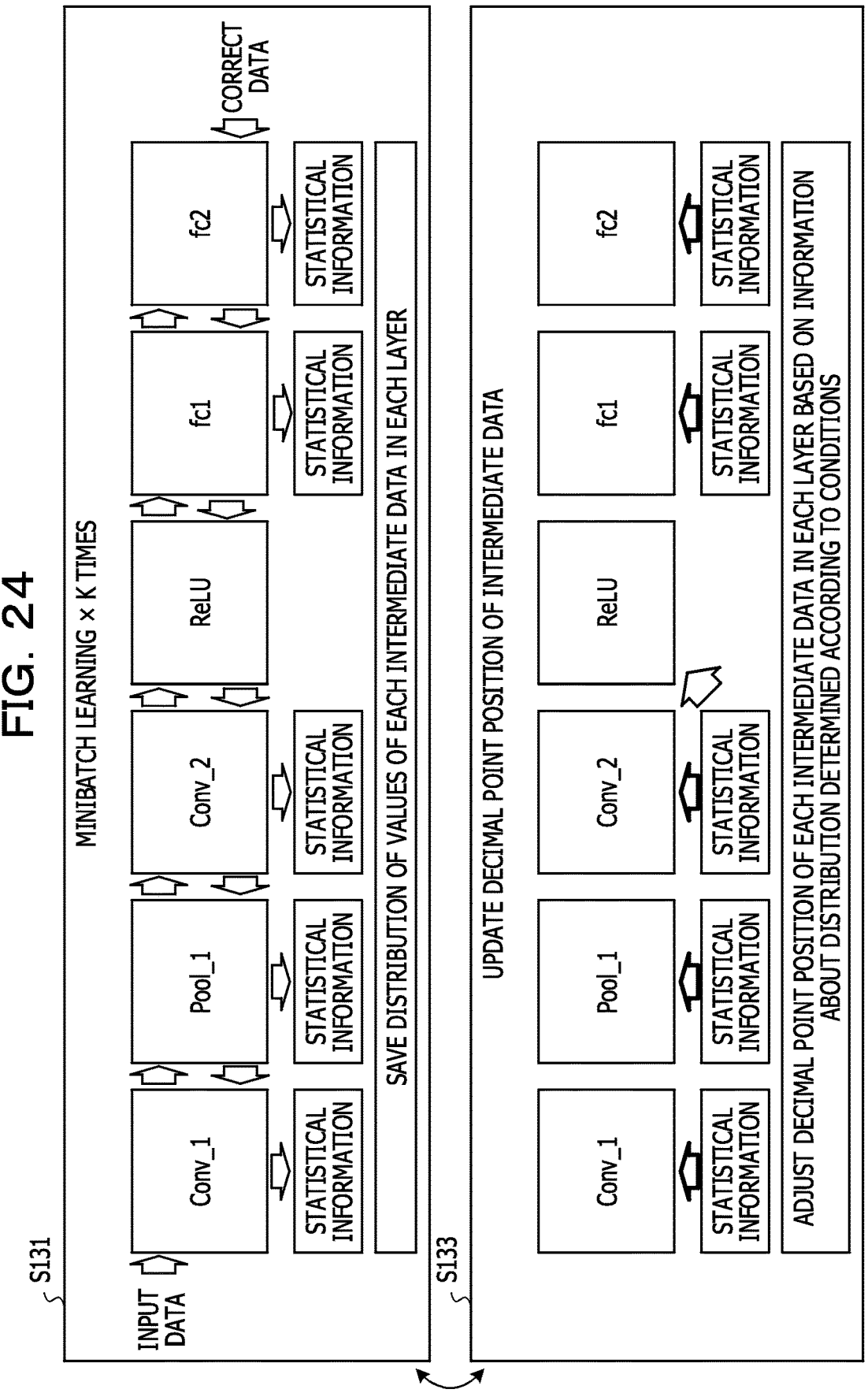
FIG. 24 is an explanatory diagram of a second example of details of S131 and S133 in the training process using the dynamic fixed-point number in FIG. 13 (second embodiment)

FIG. 24 is an explanatory diagram of a second example of details of S131 and S133 in the training process using the dynamic fixed-point number in FIG. 13.

Figure 25:
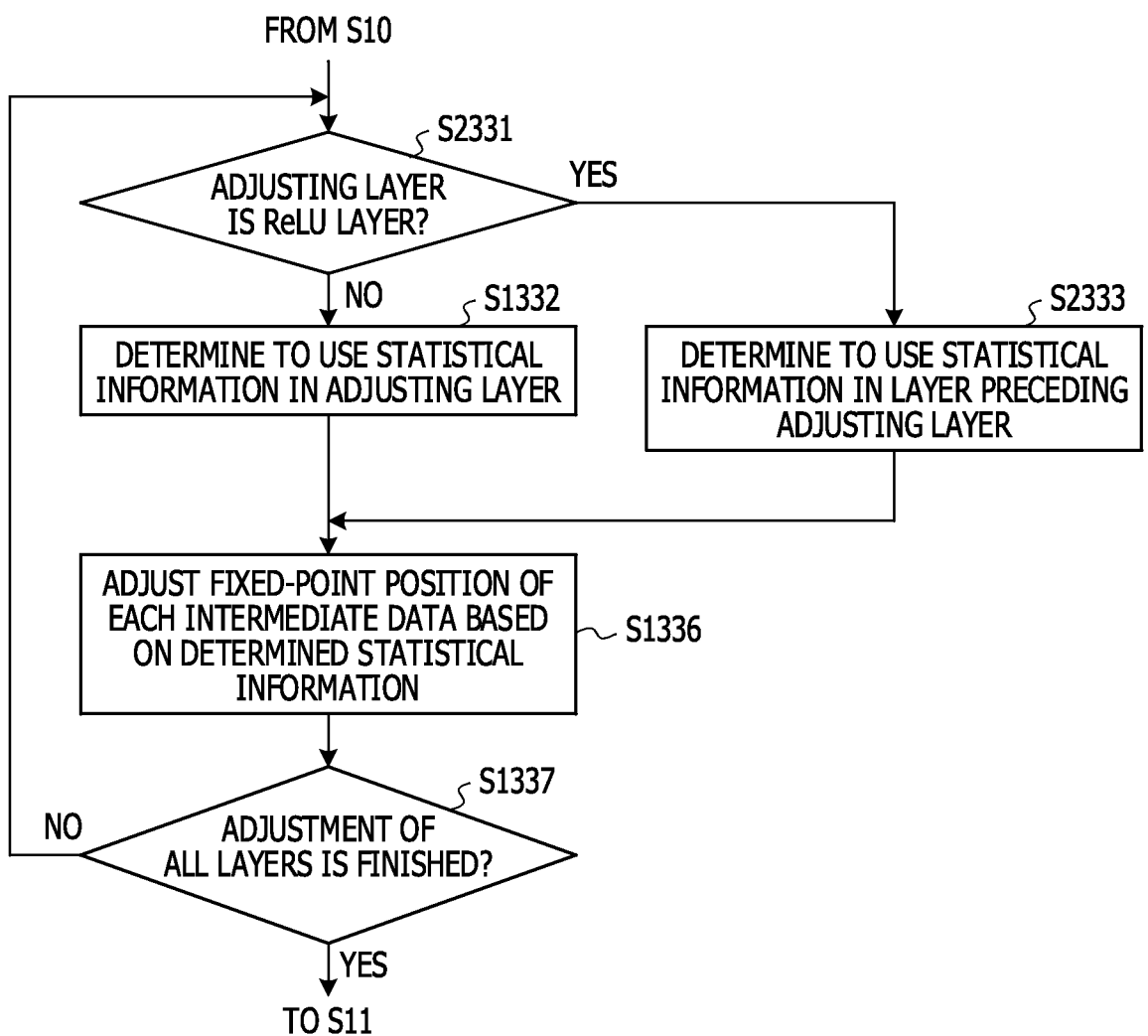
FIG. 25 is a flow chart of the second example of detailed processing in S133 in the flow chart illustrated in FIG. 13 (second embodiment)

FIG. 25 is a flow chart of a second example of detailed processing of S133 in the flow chart illustrated in FIG. 13. Description of common parts to those in the first embodiment is omitted.

The processing is started when S10 is finished, and it is determined whether or not the layer that adjusts the fixed-point position is the ReLU layer (S2331). When the adjusting layer is the ReLU layer (S2331: YES), it is determined to use statistical information in the layer preceding the adjusting layer for following processing (S2333).

Like the dropout layer, the ReLU layer uses the above-mentioned processing circuit to execute computation according to a predetermined rule. According to the predetermined rule of the ReLU layer, a value of data having a value less than 0 among outputs in the preceding layer is changed to 0, and a value of data having a value of 0 or more among outputs in the preceding layer is output as it is. A change in data due to the processing, that is, a change in the distribution of the most significant bit position of data before and after the processing in the ReLU layer may be predicted according to the predetermined rule.

In the processing in the ReLU layer, in the output of the preceding layer (Conv_2 in the example illustrated in FIG. 24), a value of data having a value less than 0 is changed to 0, and a value of data having a value of 0 or more is output as it is. Since the data having a value less than 0 is rounded-up, a maximum value and a minimum value in positive data do not change. Irrespective of data input from the preceding layer, the range of the distribution of intermediate data after the processing in the ReLU layer matches the range of statistical information about intermediate data in the layer preceding the ReLU layer (Conv_2 in the example illustrated in FIG. 24). The statistical information in the layer preceding the ReLU layer may be second statistical information, and the proper point position may be set based on the second statistical information. Thus, acquisition of statistical information in the ReLU layer may be omitted. Setting the proper point position may efficiently reduce the computation amount while keeping the computation accuracy.

Adjustment of Fixed-point Position in Deep Learning in Third Embodiment

A statistical information acquisition method in deep learning in accordance with a third embodiment will be described below with reference to FIGS. 26 and 27.

The deep learning in accordance with third embodiment has pooling layers Pool_1, Pool_2 as layers in the DNN. In the deep learning with the third embodiment, in adjusting the fixed-point position in the pooling layers Pool_1, Pool_2, the fixed-point position is adjusted based on statistical information acquired in a layer preceding the pooling layers Pool_1, Pool_2. The deep learning in accordance with the third embodiment may advantageously omit acquisition of statistical information in the pooling layer Pool_1, Pool_2, reducing the computation amount.

The processing circuit that executes the processing in the pooling layers is included in the DNN processor 43. In the processing in the pooling layer Pool_1, Pool_2, a local value, for example, a maximum value in a predetermined pixel range (kernel), among plurality of outputs x in the preceding layer is selected to acquire the outputs y in the pooling layers Pool_1, Pool_2.

Figure 26:
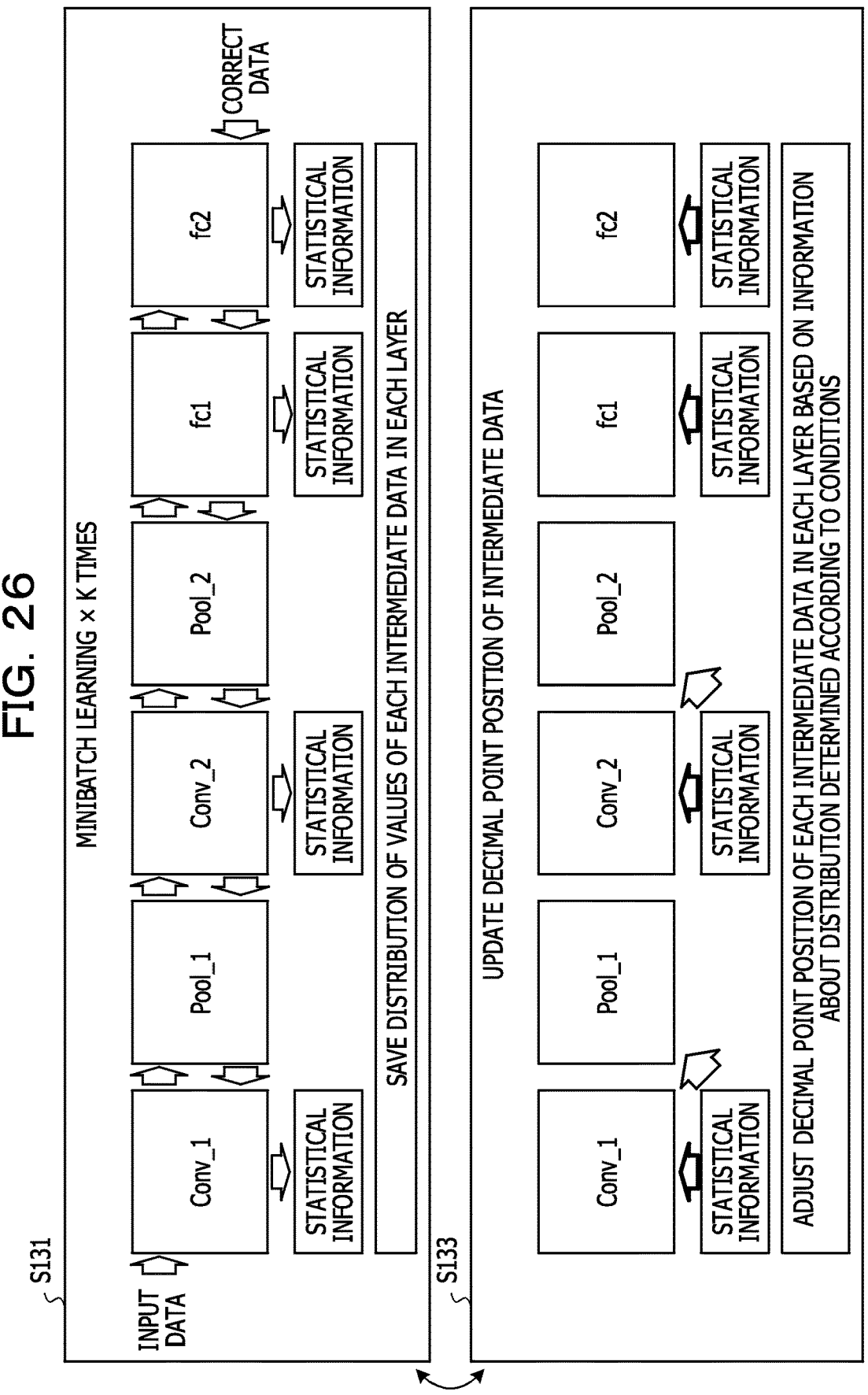
FIG. 26 is an explanatory diagram of a third example of details of S131 and S133 in the training process using the dynamic fixed-point number in FIG. 13 (third embodiment)

FIG. 26 is an explanatory diagram of a third example of details of S131 and S133 in the training process using the dynamic fixed-point number in FIG. 13.

Figure 27:
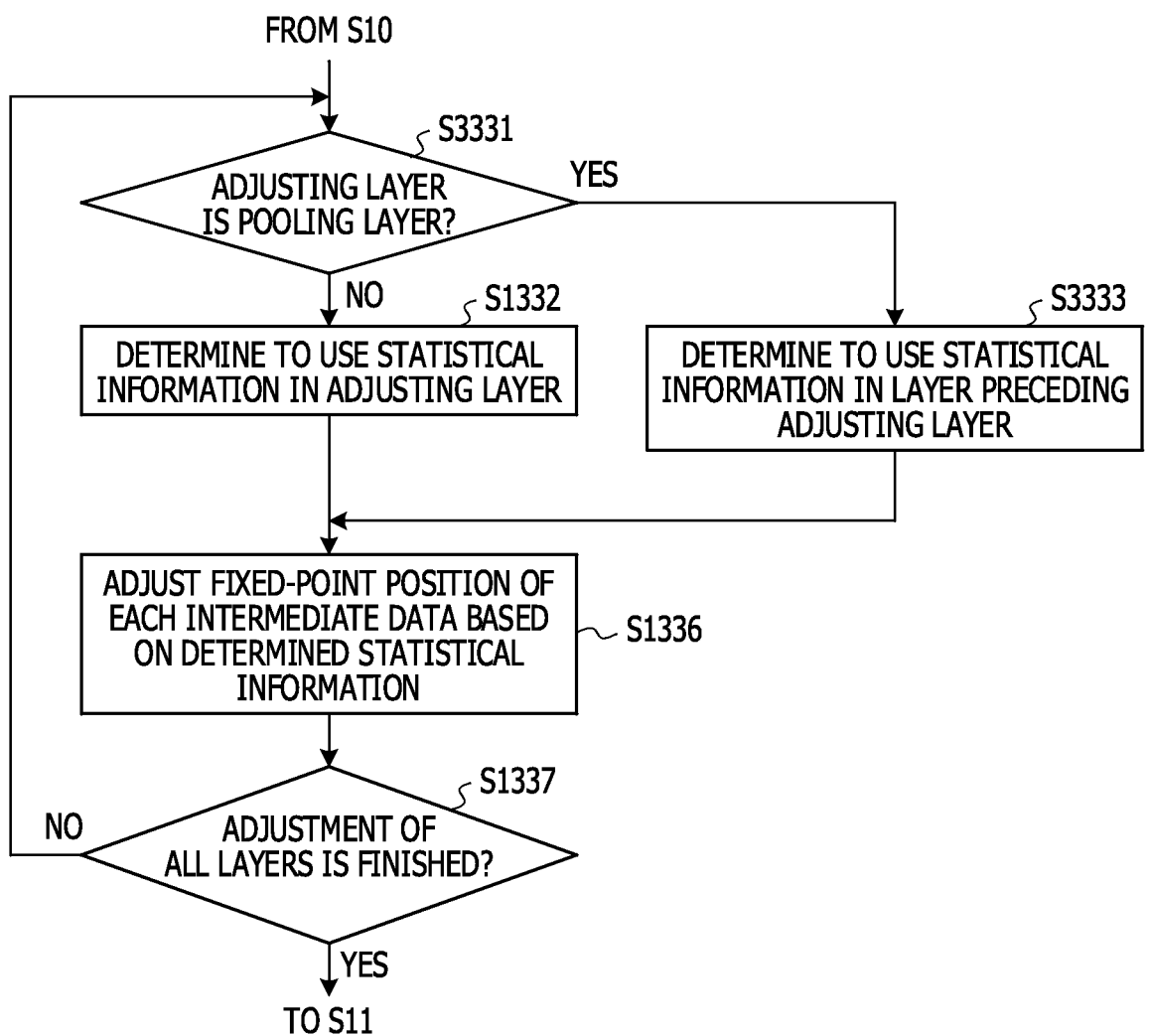
FIG. 27 is a flow chart of the third example of detailed processing of S133 in the flow chart illustrated in FIG. 13 (third embodiment)

FIG. 27 is a flow chart of a third example of detailed processing of S133 in the flow chart illustrated in FIG. 13. Description of common parts to those in the second embodiment is omitted.

The processing is started when S10 is finished, and it is determined whether or not the layer that adjusts the fixed-point position is the pooling layer (S3331). When the adjusting layer is the pooling layer (S3331: YES), it is determined to use statistical information in the layer preceding the adjusting layer for following processing (S3333).

Like the dropout layer, the pooling layer uses the above-mentioned processing circuit to perform a computation according to a predetermined rule. According to the predetermined rule of the pooling layer, a maximum value of each kernel of outputs in the preceding layer is selected, and data belonging the kernel is changed to the maximum value of the kernel. A change in data due to the processing, that is, a change in the distribution of the most significant bit position before and after the processing in the pooling layer may be predicted according to the predetermined rule.

When the maximum value is found in the processing in the pooling layer, outputs of the preceding layer (Conv_1, Conv_2 in the example illustrated in FIG. 26) are the selections of the maximum value for each kernel by the processing. Since the maximum value for each kernel is selected to output, no value more than the maximum value in the preceding layer is output. The maximum value of the distribution of intermediate data after the processing in the pooling layer matches the maximum value of the statistical information about the intermediate data in the layer preceding the pooling layer (Conv_1, Conv_2 in the example illustrated in FIG. 26). Since the maximum value of the outputs in the preceding layer only is required to be expressed, the statistical information in the layer preceding the pooling layer may be defined as second statistical information, and the proper point position may be set based on the second statistical information. For this reason, acquisition of statistical information in the pooling layer may be omitted. Setting the proper point position may efficiently reduce the computation amount while keeping the computation accuracy.

Adjustment of Fixed-point Position in Deep Learning in Fourth Embodiment

A statistical information acquisition method in deep learning in accordance with a fourth embodiment will be described below with reference to FIGS. 28 to 30.

The deep learning in accordance with the fourth embodiment has a Concat layer Concat as a layer in the DNN. In the deep learning in accordance with the fourth embodiment, in adjusting the fixed-point position in the Concat layer Concat, the fixed-point position is adjusted based on statistical information acquired in all preceding layers coupled to the Concat layer Concat. In adjusting the fixed-point position in the layer preceding the Concat layer Concat, the fixed-point position is adjusted based on statistical information acquired in all preceding layers coupled to the Concat layer Concat. The deep learning in accordance with the fourth embodiment may omit acquisition of statistical information in the Concat layer Concat, advantageously reducing the computation amount. The decimal point positions in all preceding layers and the Concat layer Concat may match each other, suppressing a decrease in the computation accuracy.

The processing circuit that executes the processing in the Concat layer Concat is included in the DNN processor 43. In the processing in the Concat layer Concat, data is divided into pieces in the middle of the DNN, and data pieces calculated in different layers are concatenated.

Since the divided data pieces concatenated in the Concat layer Concat are calculated in the different preceding layers, in the training process as an example of deep learning, the decimal point position is determined based on the computation result in the preceding layer. Often, two decimal point positions determined in the preceding layers do not match each other. When it is attempted to adjust the decimal point position in the Concat layer Concat so as to contain the maximum value in the preceding layer in the expressible range, data lost due to the dual saturation and rounding processing increases.

Figure 28:
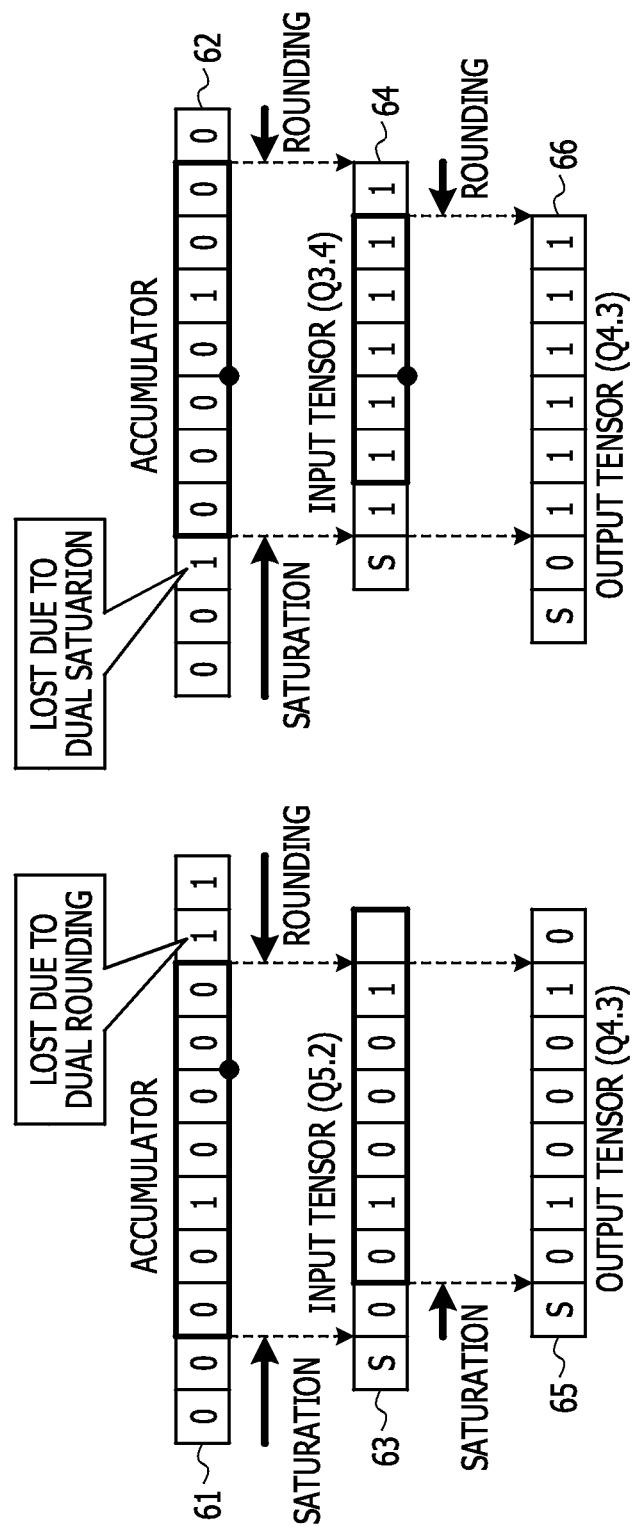
FIG. 28 is an explanatory diagram of dual saturation and rounding processing in an example of deep learning.

FIG. 28 is an explanatory diagram of dual saturation and rounding processing in an example of deep learning. Each rectangle illustrated in FIG. 28 represents a digit of input/output data. Each black circle illustrated in FIG. 28 represents the decimal point position of the fixed-point. An output 61 of a preceding layer 1 and an output 62 of a preceding layer 2 represent data in the state where values computed in the preceding layer 1 and the preceding layer 2 are stored in the vector accumulation register VC_ACC. An input 63 from the preceding layer 1 and an input 64 from the preceding layer 2 represent data that are acquired by applying saturation and rounding processing to the output 61 of the preceding layer 1 and the output 62 of the preceding layer 2, and input to the Concat layer Concat. The outputs 65, 66 of the Concat layer represent data that are acquired by applying the saturation and rounding processing to the input 63 from the preceding layer 1 and the input 64 from the preceding layer 2, and output from the Concat layer Concat. The preceding layer 1 and the preceding layer 2 are preceding layers coupled to the Concat layer Concat.

The output 61 of the preceding layer 1 and the output 62 of the preceding layer 2 are subjected to the saturation and rounding processing based on the decimal point positions determined in the preceding layer 1 and the preceding layer 2, and a value of the digit out of the expressible range corresponding to the decimal point positions is lost. The output 65 of the Concat layer is subjected to saturation and rounding processing based on the decimal point position determined in the Concat layer Concat, and a value of the digit out of the expressible range corresponding to the decimal point positions is lost. In the example illustrated in FIG. 28, the decimal point position in the preceding layer 1 is Q5.2, the decimal point position in the preceding layer 2 is Q3.4, and the decimal point position in the Concat layer Concat is Q4.3.

Since the preceding layer 1, the preceding layer 2, and the Concat layer Concat have different decimal point positions, until the output 65 of the Concat layer is computed from the output 61 of the preceding layer 1 and the output 62 of the preceding layer 2, the dual saturation and rounding processing is executed and a value of the digit out of the expressible range is present.

A hatched digit of the output 61 of the preceding layer 1 is subjected to the rounding processing based on the decimal point position Q5.2 in the preceding layer 1, and the least significant bit is complemented with "0" based on the decimal point position Q4.3 in the Concat layer Concat. The value of the hatched digit is lost from applying the dual saturation and rounding processing to the output 61 of the preceding layer 1 to outputting of the output 65 of the Concat layer.

A hatched digit the output 62 of the preceding layer 2 is subjected to the saturation processing based on the decimal point position Q3.4 in the preceding layer 2, and the most significant bit, that is, a bit adjacent to the sign bit is complemented with a positive value based on the decimal point position Q4.3 in the Concat layer Concat. In the saturation processing, for example, when the output 62 of the preceding layer 2 is positive, the value is saturated with the maximum value in the expressible range. The value of the hatched digit is lost from applying the dual saturation and rounding processing to the output 62 of the preceding layer 2 to the outputting of the output 66 in the Concat layer.

Figure 29:
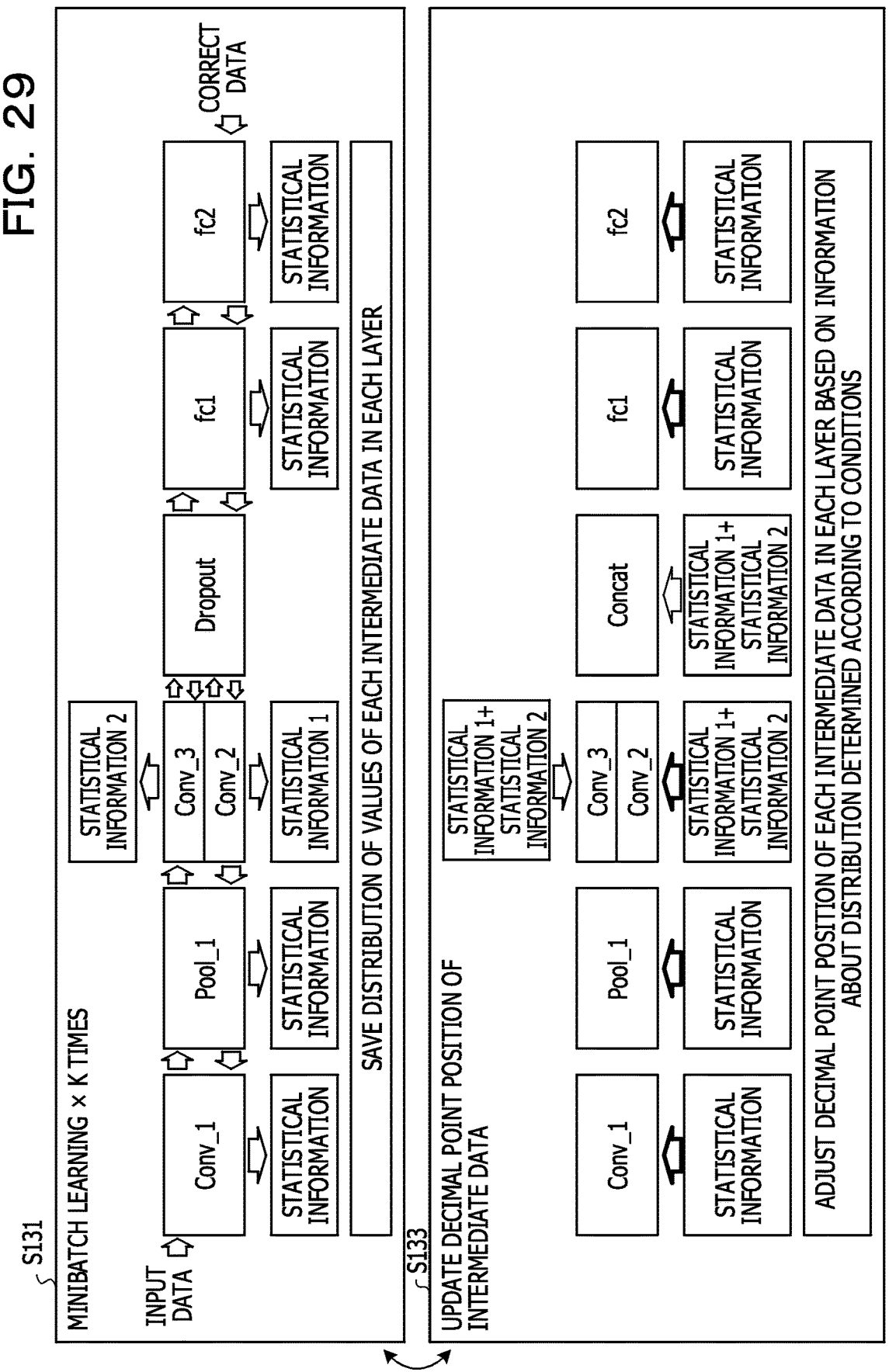
FIG. 29 is an explanatory diagram of a fourth example of details of S131 and S133 in the training process using the dynamic fixed-point number in FIG. 13 (fourth embodiment)

FIG. 29 is an explanatory diagram of a fourth example of details of S131 and S133 in the training process using the dynamic fixed-point number in FIG. 13.

Figure 30:
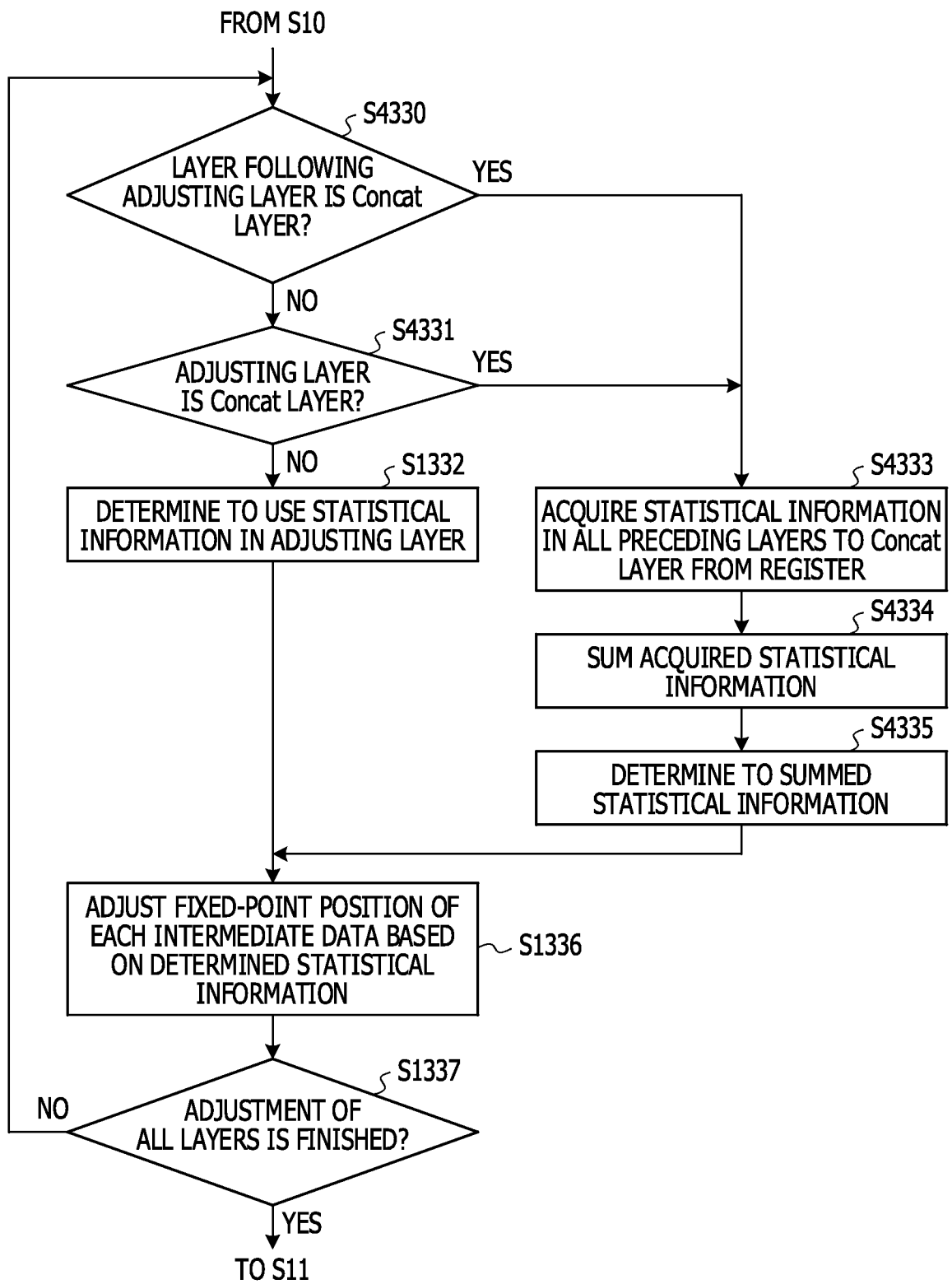
FIG. 30 is a flow chart of the fourth example of detailed processing in S133 in the flow chart illustrated in FIG. 13 (fourth embodiment).

FIG. 30 is a flow chart illustrating the fourth example of detailed processing of S133 in the flow chart illustrated in FIG. 13. Description of common parts to those in the second embodiment is omitted.

The processing is started when S10 is finished, and it is determined whether or not a layer following the layer that adjusts the fixed-point position is the Concat layer (S4330). When the layer following the adjusting layer is the Concat layer (S4330: YES), statistical information (the statistical information 1 and the statistical information 2 in the example illustrated in FIG. 29) acquired in all preceding layers (Conv_2, Conv_3 in the example illustrated in FIG. 29) coupled to the Concat layer is acquired from the register (S4333). Next, all sets of statistical information acquired in S4333 are summed (statistical information 1+statistical information 2 in the example illustrated in FIG. 29) (S4334). The summing of the statistical information is performed by the scalar computation unit SC_AR_UNIT in the DNN processor 43. Next, it is determined to use the statistical information summed in S4334 for following processing (S4335). When the layer following the adjusting layer is not the Concat layer (S4330: NO), it is determined whether or not the layer that adjusts the fixed-point position is the Concat layer (S4331). When the adjusting layer is the Concat layer (S4331: YES), the processing S4333 to S4335 is executed. The statistical information determined to be used in the layer preceding the Concat layer may be used as the statistical information used for following processing in the Concat layer. The fixed-point position adjusted in the preceding layer may be used as the fixed-point position in the Concat layer.

The Concat layer executes computation according to a predetermined rule. According to the predetermined rule of the Concat layer, outputs in the preceding layers are concatenated. A change in data due to processing, that is, a change in the distribution of the most significant bit position of data before and after the processing in the Concat layer may be predicted according to the predetermined rule.

In the processing in the Concat layer Concat, outputs of the preceding layer (Conv_2, Conv_3 in the example illustrated in FIG. 29) are concatenated and handled as one data group. For example, since the data group in the preceding layer 1 and the data group in the preceding layer 2 are concatenated, statistical information acquired by summing statistical information 1 in the preceding layer 1 and statistical information 2 in the preceding layer 2 corresponds to the distribution of intermediate data after the processing in the Concat layer Concat. The proper point position may be set based on summed statistical information in all layers preceding the Concat layer Concat. For this reason, acquisition of the statistical information in the Concat layer Concat may be omitted. The decimal point positions in all preceding layers and the Concat layer Concat may match each other, such that the dual saturation and rounding processing is not executed until the output of the Concat layer Concat is computed from the outputs in the preceding layers, thereby suppressing a loss of values. Setting the proper point position may efficiently reduce the computation amount while keeping the computation accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processor comprising:
   a memory; and
   a processor coupled to the memory and the processor configured to:
   in computation in a plurality of layers of a neural network for performing deep learning, acquire first statistical information about distribution of most significant bit position that is not a sign or least significant bit position that is not zero for each of a plurality of first fixed-point number data, the plurality of first fixed-point number data being a computation result of the computation in the first layer based on input data to the first layer;
   execute computation on a plurality of output data of the first layer according to a predetermined rule, in the computation in the second layer;
   acquire second statistical information based on the predetermined rule and the first statistical information;
   determine a bit range for limiting a bit width when a plurality of second fixed-point number data, the plurality of second fixed-point number data being a computation result of the computation in the second layer, are stored in a register, based on the second statistical information;
   shift the plurality of second fixed-point number data based on the determined bit range, with saturation of higher-order bits than the bit range and rounding of lower-order bits than the bit range, of each of the plurality of second fixed-point number data; and
   output the shifted plurality of second fixed-point number data.

2. The information processor according to claim 1, wherein
   in the computation according to the predetermined rule, predetermined ratio of data to the plurality of output data of the first layer is multiplied by 0, and remaining output data of the first layer is multiplied by a coefficient found from the predetermined ratio, and
   the second statistical information is acquired by shifting the first statistical information, based on the coefficient.

3. The information processor according to claim 1, wherein
   in the computation according to the predetermined rule, a value of data having a value less than 0 among the plurality of output data of the first layer is multiplied by 0.

4. The information processor according to claim 1, wherein
   in the computation according to the predetermined rule, the plurality of output data of the first layer are divided into a plurality of groups, a maximum value of a predetermined group among the plurality of groups is found, and a value of each of the output data of the first layer belonging to the predetermined group is changed to the maximum value of the predetermined group.

5. The information processor according to claim 1, wherein the processor is configured to
   acquire third statistical information about distribution of most significant bit position or least significant bit position for each of a plurality of third fixed-point number data, the data being a computation result of the computation in a third layer, wherein
   in the computation according to the predetermined rule, the plurality of output data of the first layer and a plurality of output data from the third layer are concatenated, and
   the second statistical information is acquired by summing the first statistical information and the third statistical information.

6. An information processing method executed by a computer, the information processing method comprising:
   in computation in a plurality of layers of a neural network for performing deep learning, acquiring first statistical information about distribution of most significant bit position that is not a sign or least significant bit position that is not zero for each of plurality of first fixed-point number data, the plurality of first fixed-point number data being a computation result of the computation in the first layer based on input data to the first layer;
   executing computation on plurality of output data of the first layer according to a predetermined rule, in the computation in the second layer;
   acquiring second statistical information based on the predetermined rule and the first statistical information;
   determining a bit range for limiting a bit width when a plurality of second fixed-point number data, the plurality of second fixed-point number data being a computation result of the computation in the second layer, are stored in a register, based on the second statistical information;
   shifting the plurality of second fixed-point number data based on the determined bit range, with saturation of higher-order bits than the bit range and rounding of lower-order bits than the bit range, of each of the plurality of second fixed-point number data; and
   outputting the shifted plurality of second fixed-point number data.

7. A non-transitory computer-readable storage medium storing a program that causes a computer to execute a process, the process comprising:
- in computation in a plurality of layers of a neural network for performing deep learning, acquiring first statistical information about distribution of most significant bit position that is not a sign or least significant bit position that is not zero for each of plurality of first fixed-point number data, the plurality of first fixed-point number data being a computation result of the computation in the first layer based on input data to the first layer;
- executing computation on the plurality of output data of the first layer according to a predetermined rule, in the computation in the second layer;
- acquiring second statistical information based on the predetermined rule and the first statistical information;
- determining a bit range for limiting a bit width when a plurality of second fixed-point number data, the plurality of second fixed-point number data being a computation result of the computation in the second layer, are stored in a register, based on the second statistical information;
- shifting the plurality of second fixed-point number data based on the determined bit range, with saturation of higher-order bits than the bit range and rounding of lower-order bits than the bit range, of each of the plurality of second fixed-point number data; and
- outputting the shifted plurality of second fixed-point number data.

* * * * *